(12) United States Patent
Rubinstein et al.

(10) Patent No.: US 10,884,575 B2
(45) Date of Patent: Jan. 5, 2021

(54) EXTENSIBLE AND ADAPTABLE TOOLSETS FOR COLLABORATION APPLICATIONS

(71) Applicant: MICROSOFT TECHNOLOGY LICENSING, LLC, Redmond, WA (US)

(72) Inventors: Mark I. Rubinstein, Bellevue, WA (US); Mark Robert Swift, Mercer Island, WA (US); Xiaoyue Wang, Bellevue, WA (US); Michael Brasket, Redmond, WA (US); Thaddeus A. Scott, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/416,822

(22) Filed: May 20, 2019

(65) Prior Publication Data

US 2020/0371663 A1    Nov. 26, 2020

(51) Int. Cl.
*G06F 3/0481* (2013.01)
*G06F 3/0484* (2013.01)
*G06F 40/117* (2020.01)
*G06F 40/169* (2020.01)

(52) U.S. Cl.
CPC ...... *G06F 3/04812* (2013.01); *G06F 3/04817* (2013.01); *G06F 3/04842* (2013.01); *G06F 40/117* (2020.01); *G06F 40/169* (2020.01)

(58) Field of Classification Search
CPC ............ G06F 3/04812; G06F 3/04817; G06F 3/04842; G06F 40/169; G06F 40/117
See application file for complete search history.

(56) References Cited

U.S. PATENT DOCUMENTS

| 2005/0114475 | A1 | 5/2005 | Chang et al. |
| 2005/0138118 | A1 | 6/2005 | Banatwala et al. |
| 2010/0058201 | A1 | 3/2010 | Harvey et al. |
| 2010/0257457 | A1 | 10/2010 | De Goes |

(Continued)

FOREIGN PATENT DOCUMENTS

EP    1526463 A1    4/2005

OTHER PUBLICATIONS

"Microsoft 365 is Built for Teamwork", Retrieved From: https://cloudblogs.microsoft.com/industry-blog/en-au/financial-services/2017/09/15/microsoft-365-is-built-for-teamwork/, Sep. 15, 2017, pp. 1-5.

(Continued)

*Primary Examiner* — Andrew T Chiusano
(74) *Attorney, Agent, or Firm* — Newport IP, LLC; Benjamin A. Keim

(57) ABSTRACT

The techniques disclosed herein provide a contextual toolset for use in canvases of collaboration applications. The techniques also provide smart hooks for pinning tools to specific locations on content opened in a canvas. The contextual toolset may include tools specific to an application opened in a canvas and/or tools for implementing the functionality of external applications. The smart hooks maintain linkages between an instance of tool usage and an object in a file or other content. The linkages maintain the tool in the same location relative to the object even if the object is moved. Instances of external applications opened in a canvas may be presented in a dedicated user interface region that passes data to and from the external application.

20 Claims, 16 Drawing Sheets

(56) References Cited

U.S. PATENT DOCUMENTS

| | | |
|---|---|---|
| 2010/0306004 A1 | 12/2010 | Burtner et al. |
| 2011/0125733 A1 | 5/2011 | Fish et al. |
| 2013/0212485 A1 | 8/2013 | Yankovich et al. |
| 2014/0280384 A1* | 9/2014 | Schoeffler ............. G06F 16/958 707/812 |
| 2014/0350997 A1 | 11/2014 | Holm et al. |
| 2015/0058747 A1 | 2/2015 | Tetsuhashi |
| 2015/0199317 A1* | 7/2015 | Lemonik ............. G06F 9/44526 715/255 |
| 2017/0277671 A1* | 9/2017 | Duggan .................... G06T 3/60 |
| 2018/0260366 A1 | 9/2018 | Brasket et al. |
| 2019/0123924 A1* | 4/2019 | Embiricos ........... H04L 12/1822 |

OTHER PUBLICATIONS

"New Ways to use Apps and Get More Done in Microsoft Teams", Retrieved From: https://www.microsoft.com/en-us/microsoft-365/blog/2018/01/29/new-ways-to-use-apps-and-get-more-done-in-microsoft-teams/, Jan. 29, 2018, 6 Pages.

"The Collaboration Hub that Moves Work Forward", Retrieved From: https://web.archive.org/web/20190207041658/https://slack.com/features, Retrieved Date: Feb. 7, 2019, 8 Pages.

"International Search Report & Written Opinion issued in PCT Application No. PCT/US20/028014", dated Jul. 31, 2020, 13 Pages.

* cited by examiner

EXTENSIBLE AND ADAPTABLE TOOLSETS FOR COLLABORATION APPLICATIONS

BACKGROUND

There are a number of different systems and applications that allow users to collaborate. For example, some systems allow people to collaborate by the use of live video streams, live audio streams, and other forms of real-time text-based or image-based mediums. Some systems also allow users to share files during a communication session. Further, some systems provide users with tools for editing content of shared files.

Although existing systems allow users to share and edit the content of files, some existing systems have a number of shortcomings. For instance, some systems do not maintain associations between certain types of edited content and shared files after a communication session ends. In one specific example, some collaboration applications, also referred to herein as "applications," provide tools that allow users to create supplemental content for a file such as voting polls, graphical highlights that bring focus to select content, specialized inking annotations, etc. However, once a communication session ends, the supplemental content may be saved separately from the associated file. Thus, if the user wants to view poll results with an associated document after a communication session ends, that user has to perform a number of manual steps to retrieve the poll data and the document. Moreover, there is generally no indication of which portion or aspect of the document is associated with the poll results.

In another example, collaboration applications are generally limited when it comes to the diversity of available tools for editing content of different types of files. For instance, a collaboration application typically displays the same set of tools for editing different file types, e.g., standard cut and paste tools are displayed regardless if the user is editing a word processing document or a spreadsheet file. This shortcoming requires users to utilize different applications in addition to a collaboration application in order to access specialized tools. Using multiple, different applications to access the specialized tools is inefficient and ultimately results in unnecessary use of computing resources such as bandwidth, processing resources, and memory.

One solution that can be used to address the above-noted shortcoming is that some applications can increase the number of available tools to a user. However, this solution of displaying a large number of tools is an inefficient use of screen space. This ultimately detracts from the user experience. Based on these shortcomings, there is a continual need to improve collaboration applications.

SUMMARY

The techniques disclosed herein describe a system for dynamically selecting and displaying extensible and adaptable toolsets for collaboration applications. A collaboration application can provide a shared content editing workspace, e.g., a canvas, that can dynamically select and display contextually relevant toolsets and individual tools provided by external applications. The adaptable toolset allows an application to provide users with access to a wide range of tools for interacting with the content and promote more efficient use of the editing workspace by selecting and displaying specific sets of the tools based on a user's activity. The application can also provide smart hooks that graphically associate, e.g., pin, a location with content that was created by tool usage.

In one illustrative example, an application may modify a contextual toolset to include a "measuring" tool for measuring distances when a map is opened within the shared content editing workspace. The measuring tool may appear in the contextual toolset only when a map is opened in the collaboration application. The smart hooks can associate use of the measuring tool with a specific location on a map so that the use of the measuring tool by a first user is shown as pinned to that specific location. Thus, if a second user opens the map in a collaboration application, the smart hook will provide the collaboration application with data referencing the specific location. The second user will then see the use of the measuring tool shown at the same location on the map as the first user.

The collaboration application may include a contextual toolset and shared workspace, e.g., a canvas, in which multiple users interact and collaboratively edit content. One or more applications may be opened within the canvas. Applications opened in the canvas can include productivity applications such as word processing applications, spreadsheet applications, presentation applications, graphics applications, and the like. Applications that are capable of being accessed in the canvas are referred to as canvas applications. A canvas application opened in the canvas may itself open one or more sources of content such as files. The functionality of the canvas application with respect to a file may be different when the canvas application opens the file in the canvas. For example, the contextual toolset may include tools specific to an application opened in the canvas. Additionally, the contextual toolset may provide new tools that implement the functionality of an external application.

The contextual toolset may automatically change the selection of tools offered depending on the canvas application opened in the canvas of the collaboration application. Thus, when a word processing application is open in the canvas a different set of tools will be shown than when a diagramming application is open in the canvas. The tools are provided in a tool selection element which may be implemented as a toolbar, as a tool menu, or as another type of user interface (UI) element that provides an extensible and adaptable selection of tools.

Tools available in the canvas application may also be provided by a "third-party" or external application that is neither the collaboration application nor a canvas application. The external application is not opened in and does not occupy the canvas in the same way as a canvas application. Rather, the external application contributes functionality to the collaboration application in the form of one or more tools that expands the available tools in the toolset. Tools provided by an external application may be used across multiple canvases and do not necessarily change based on the type of canvas application opened within the collaboration application. Thus, for example, once the tool of an external application is provided to the collaboration application, that external application tool may be available regardless of the canvas application opened in the canvas.

Tools, from any source, may be used to create specific instances of tool usage that can be pinned to a specific location on content opened in the canvas. The pinning is mediated by the collaboration application so a pinned tool may be visible only when the file or other type of content is opened in the canvas of the collaboration application. The specific instance of a tool usage is a single use of a tool in a file. For example, a tool that creates "sticky notes" may be used to create a first sticky note that is used on a word processing document containing a short story and a second sticky note that is used by a different word processing document containing a resume. The tool itself is the same, but the specific instances of use on the short story and on the resume are different uses with separate files. There may also be multiple instances of use of a tool within a single file such as placing multiple sticky notes on the same file.

Each instance of use of a tool is associated with a particular set of content and not just with the canvas application which opened the content. The association with the content may be made with respect to a specific location in a file. This association between a specific instance of the use of a tool and a location in the file is referred to as "pinning." Pinning creates a link between a specific instance when a tool was used and a particular object or position in the displayed content. Pinning does not merely associate the use of a tool with "a pane of glass" that is overlaid on top of a file but links the tool to an actual entity included in the file and displayed in the canvas. The entity may be an object in the file such as, but not limited to, a paragraph of a text document or a shape in a diagram. Different types of files may present different types of objects on to which use of a tool may be pinned. Pinning does not remove a tool from a toolbar, menu, etc. but only associates one instance of the use of that tool with a location in a file.

Tools provided by an external application may be created in a dedicated user interface region within the collaboration application that is separate from the rest of the canvas. In order to present any UI elements created by an external application, a portion of the canvas may pass data to and from the external application without being changed by the collaboration application. This portion of the canvas may form a "container" that presents content directly from the external application and allows users of the collaboration application to interact with this external application without separately launching the external application. The container may appear, for example, as a window within the canvas that shows text, images, data, etc. provided by the external application.

A tool from an external application may be presented in the tool selection element of a collaboration application by rendering an extensible control. The extensible control that represents the external application tool may be an icon, a text label, or the like. A user interacts with the tool selection element to select the external application tool. This selection of the external application tool is received by the system.

The system also receives an indication of a location on the content opened in the canvas from user interaction. The user may provide this indication by selecting a location or object within the displayed content. This provides an association between the external application and a specific object or location in the content.

Once the location has been provided, an anchor representing the tool (e.g., an icon) is placed at the location. This provides, within the UI created by the collaboration application, a visual association between a specific instance of use of the external application and a location on the file. The anchor is pinned at the location of the file in which it was placed.

A smart hook that includes an identifier of the file, such as a file name, an identifier of the tool from an external application, and an identifier of the location is stored by the collaboration application. The smart hook is a way to stitch together the file and the specific instance of a use of the tool. The smart hook includes data that maintains associations between an instance of tool usage and an object in a file. The association maintains the tool in the same location relative to the object in the file even if the object is moved. The smart hook allows the anchor representing the tool from the external application to be placed at the same location on the file when the file is reopened in the canvas. Thus, even after a communication session has finished, if that same file is again opened within the collaboration application the link to the tool and the specific location which the tool was used will be remembered and restored.

This creates an improved UI and user experience by pinning the use of a tool to a specific location in the file. Therefore, there is no need for users to manually remember the association between the tool and the file. Also, the full context of how the tool was used with respect to a location in the file is stored in the smart hook and available whenever that file is subsequently opened in the canvas. This reduces usage of computing resources such as processing power and memory because a single application (i.e., the collaboration application) rather than multiple applications can provide the tool, association with a specific location in the canvas application, and access to data/functionality from the external application.

Additionally, using a portion of the canvas as a dedicated container for showing content from the external application creates a more compact UI that does not require users to open multiple applications in separate windows. It also tightly links the content generated through the external application with a specific location on the file that is opened in the canvas. Accordingly, there is no need for separate record-keeping, notes, email messages, etc. to explain how the use of the external application relates to the file. In addition to reducing user mistakes or misunderstandings, this technique reduces the computer resources necessary for storing and communicating the additional notes or other results of tool usage. This can directly lead to more efficient use of computing resources such as memory, network bandwidth, processing power, etc. because multiple types of user interactions and communications regarding a file opened in a canvas are managed by the collaboration application rather than multiple separate applications.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1A:
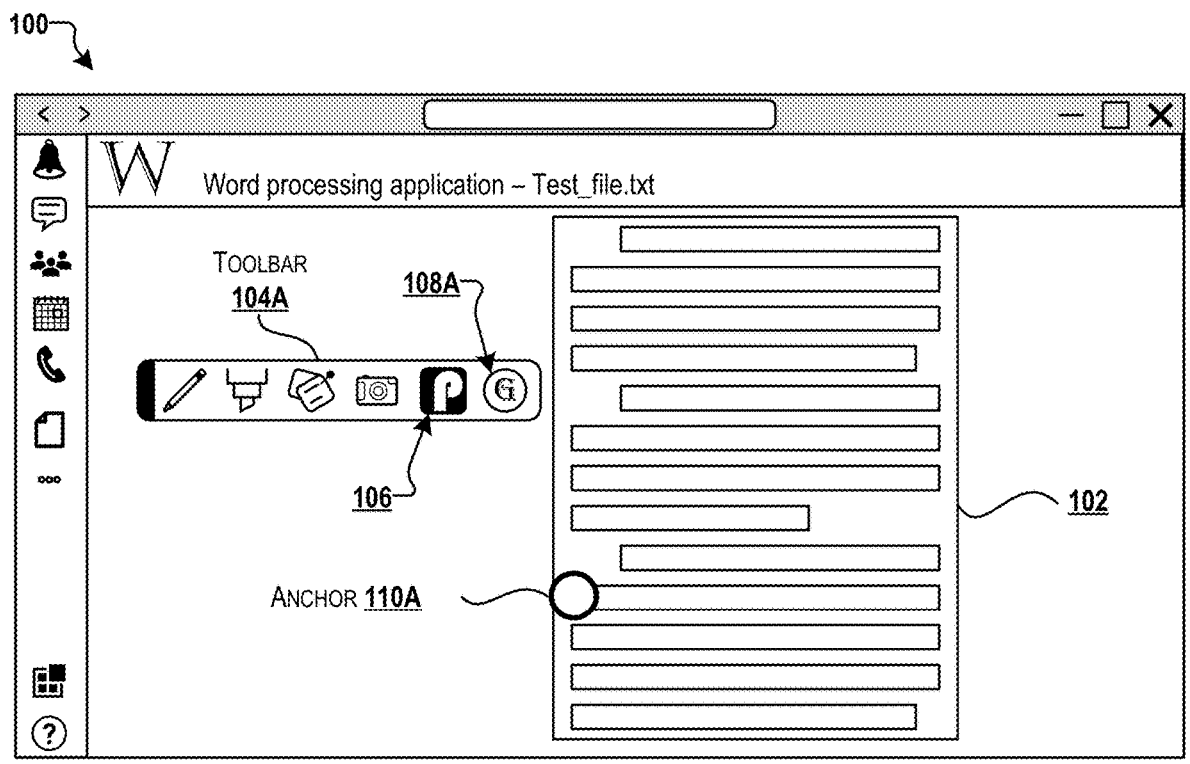
FIG. 1A illustrates a UI of a collaboration application that shows a word processing file opened in a canvas with an extensible toolbar and a tool pinned to the word processing file.

FIG. 1A illustrates an example UI 100 of a collaboration application in which a text file 102 is opened within a word processing application. The collaboration application is a software application that may hold a variety of content for multiple users to interact with simultaneously and/or sequentially. The collaboration application may include functionality such as a chat function, live video streams, live audio streams, and file sharing. Examples of collaboration applications include MICROSOFT TEAMS, SLACK, GOOGLE HANGOUTS, and FACEBOOK WORKPLACE. The collaboration application may be any type of application and is not limited to only applications with specific types of functionality (e.g., video streaming, audio streaming, etc.).

The UI 100 also includes a toolbar 104A that presents a set of tools available to a user of the collaboration application. The toolbar 104A is both contextual and extensible in that the tools change based on context and additional tools may be added. The tools in the toolbar 104A may include an external application tool 106 that is an extensible control represented in this example by a stylized letter P within a square having rounded corners. The external application tool 106 is an example of an extensible control that may be added to the toolbar 104A. The external application tool 106 may access the functionality of a polling application. When added to the toolbar 104A of the collaboration application, the polling application may then be available to all canvas applications opened in the collaboration application.

The toolbar 104A may also include a contextual tool 108B that is associated with the word processing application. The contextual tool 108B is represented by a stylized letter G in a circle. The contextual tool 108B may be grammar checking tool. The contextual tool 108B is specific to the word processing application. Thus, the toolbar 104A may show the contextual tool 108B when the word processing application is opened but not when other types of canvas applications are opened in the collaboration application. Inclusion, or not, of the contextual tool 108B is an example of how the toolbar 104A can be changed based on context.

The example UI 100 also shows an example of an anchor 110A that indicates the location where a tool is pinned to a part of the text file 102. The anchor 110A may be rendered in the UI 100 as an icon, symbol, text, or other representation of a tool from the toolbar 104A or of another tool available to the collaboration application. The anchor 110A may be associated with a specific location in the text file 102 so that the location of the anchor 110A will move if the corresponding object (e.g., paragraph, sentence, word, etc.) if the text file 102 moves. The anchor 110A may also persist across multiple sessions so that it will appear in the same location when the text file 102 is next opened.

Figure 1B:
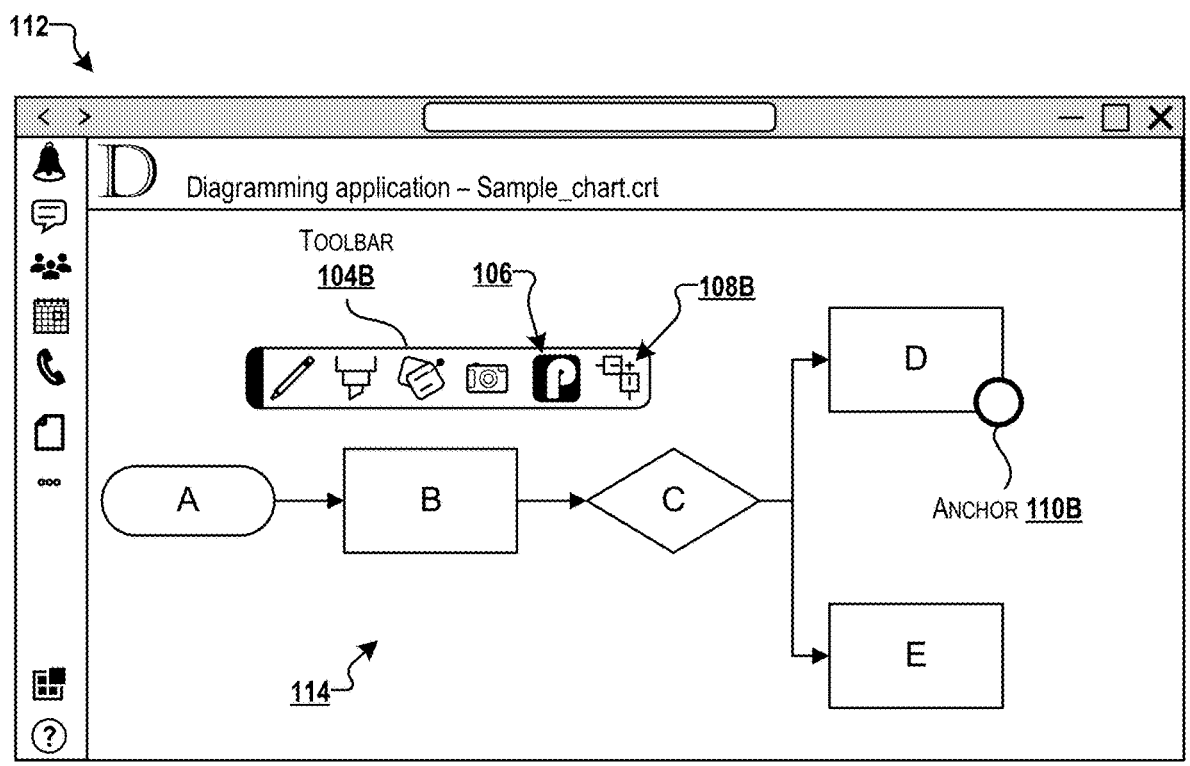
FIG. 1B illustrates a UI of a collaboration application that shows a chart file opened in the canvas, the extensible toolbar of FIG. 1A with a different selection of tools and a tool pinned to an object in the chart file.

FIG. 1B illustrates an example UI 112 that is similar to the example UI 100 of FIG. 1A but that includes a chart file 114 instead of the text file 102. The toolbar 104B in example UI 112 is similar but not identical to the toolbar 104A from the example UI 100 of FIG. 1A. In this example UI 112 a different type of application is opened, a diagramming application rather than a word processing application. This toolbar 104B includes a different contextual tool 108B than the toolbar 104A of FIG. 1A. Specifically, the grammar checking tool is no longer available (grammar checking has limited use for the chart file 114) but a contextual tool 108B that provides the functionality of aligning shapes is included in the toolbar 104B. This contextual tool 108B for aligning shapes is added to the toolbar 104B because the application open in the collaboration application is a diagramming application. Inclusion of the contextual tool 108B for aligning shapes and omission of the contextual tool 108A for grammar checking is an example of the toolset in the toolbar 104 adapting based on context.

The external application tool 106 is still included in the toolbar 104B. Presence of the external application tool 106 in the toolbar 104 is based on the external application being loaded, linked, associated, or otherwise made available to the collaboration application. The availability of the external application tool 106 may be selected based on a data type of a file opened in the collaboration application.

The example UI 112 also includes an anchor 110B that is different from the anchor 110A in FIG. 1A. The anchor 110B represents a specific instance of a tool usage that is associated with rectangle "D" in the chart file 114. The anchor 110B may represent use of the same or a different tool than the anchor 110A shown in FIG. 1A. Even if both anchors 110A, 110B represent use of the same tool, they show separate instances of that tool being used in different files within different applications. The anchor 110B may also be pinned to an object in the chart file 114 (i.e., rectangle "D") in the same manner as the anchor 110A in FIG. 1A is pinned to an object in the text file 102. Like the anchor 110A in FIG. 1A, this anchor 110B may also move with rectangle "D" and appear at the same location each time the chart file 114 is opened in the collaboration application 112.

Figure 2:
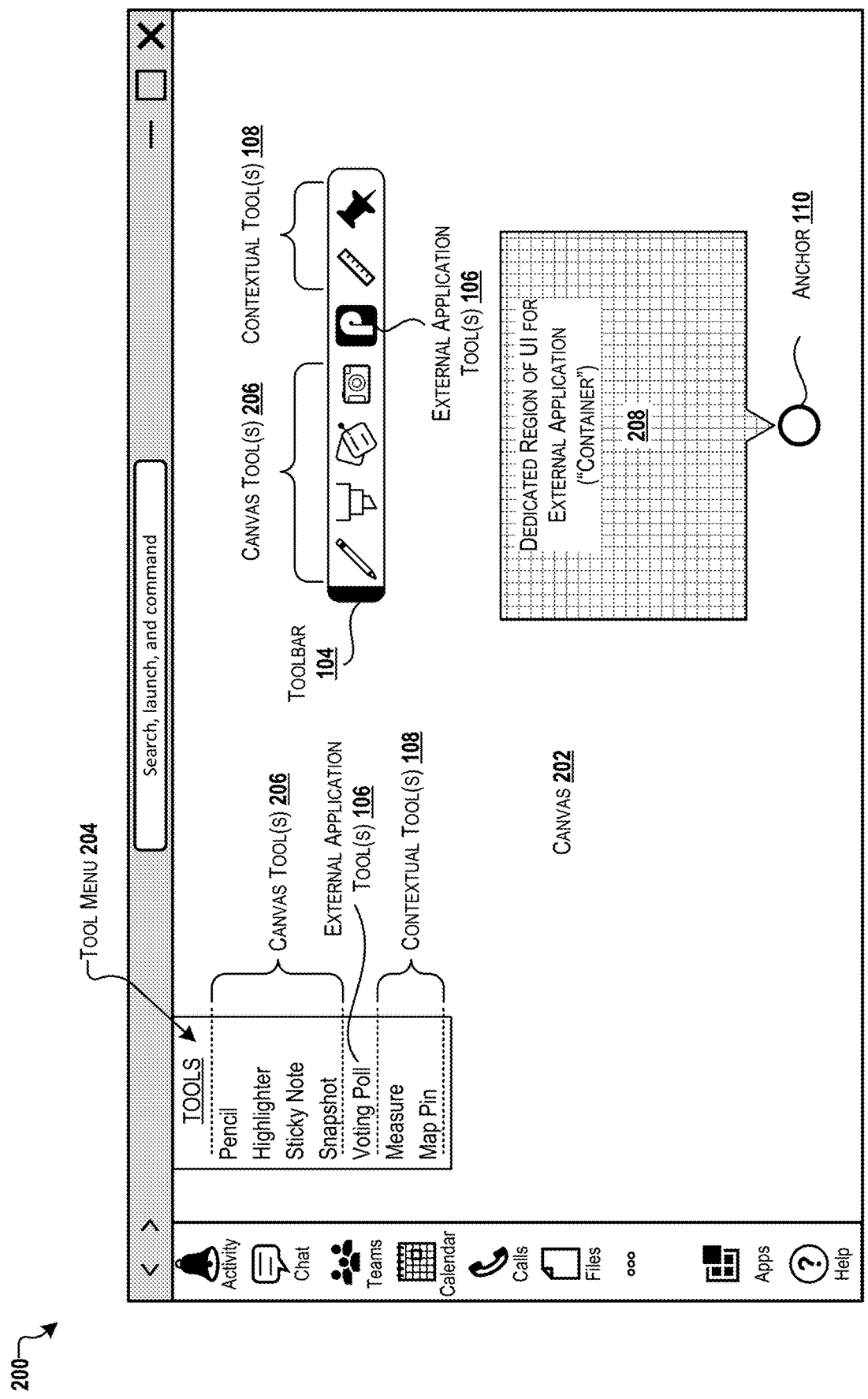
FIG. 2 illustrates a UI of a collaboration application that shows a canvas, an adaptive and extensible tool menu, an adaptive and extensible toolbar, and a dedicated region of the UI for presenting an external application.

FIG. 2 illustrates an example UI 200 of a collaboration application containing a canvas 202. Example UI 200 expands on UI 100 and UI 112 of FIG. 1 by providing additional details and UI elements.

The canvas 202 in the collaboration application is a region of a UI that holds content from the collaboration application or from one or more other applications. Any type of application may potentially be opened in the canvas 202. Examples of applications that may be opened in the canvas 202 include productivity applications like word processing applications, spreadsheet applications, diagramming applications, presentation applications, photo or video editing applications, and the like. Applications that are opened in a collaboration application and accessed through the canvas 202 may be referred to as canvas applications.

The canvas 202 can function as a shared workspace in which multiple users joined in a collaboration session may communicate with each other and interact with a file opened in one of the canvas applications opened in the canvas 202. However, the canvas 202 may also be used by a single user without collaborating with other users. Multiple users can collaboratively interact with a canvas application opened in the canvas 202 in a manner that is the same or similar to how the users interact with those applications running as stand-alone instances outside of the canvas 202. However, accessing an application within the canvas 202 provides additional functionality such as the ability to view and manipulate the file collaboratively and addition of tools and features that may not be available in the canvas application when used outside of the canvas 202.

The canvas 202 may provide any one or more different types of tool selection elements. Tool selection elements may be implemented, for example, as a tool menu 204 or as a toolbar 104. The toolbar 104 may be implemented as a floating toolbar that can be moved by a user to various locations within the canvas 202. The tools provided through a tool selection element by the collaboration application is presented in addition to any tools or functionalities available in an application that is opened in the canvas 202. Because the tool selection elements are generated as part of the canvas 202, these tools may be unavailable when an application is launched outside of the canvas 202.

The tools available through the tool menu 204, the toolbar 104, or another a tool selection element are part of a context-aware extensible toolset. The toolset is extensible because additional tools may be added to it by the collaboration application, a canvas application, or by an external application. The toolset is context-aware because specific tools available may depend on the context of the collaboration application such as the type of application opened in the canvas 202 or the way in which the collaboration application is being used (e.g., in presentation mode). The tools available in this extensible toolset are illustrated in this example UI 200 as the tool menu 204 and the toolbar 104. The toolset may include canvas tools 206, external application tools 106, and contextual tools 108.

Canvas tools 206 include standard tools or universal tools that may be a built-in part of the collaboration application and are available with all, or nearly all, canvas applications as well as potentially available when there is no canvas application opened in the canvas 202. Examples of canvas tools 206 may include a Pencil for annotating, a Highlighter for highlighting text, a Sticky Note tool for adding a note, and a Snapshot tool for capturing an image of content displayed in the canvas 202. These are merely examples of tools and other types of tools may be included as one of the canvas tools 206. Canvas tools 206 generally provide functionality that is broadly applicable in many different scenarios and with many different types of canvas applications.

External application tools 106 provide access to the functionality and data of external applications. External applications are not the collaboration application nor the primary application opened in the canvas 202. However, the developer or company that creates an external application may be the same as the developer or company that creates the collaboration application or a canvas application. One or more external applications may be implemented within the canvas 202 as a small instance of the external applications. Thus, the features and functionality of an external application available through the external application tool 106 in canvas 202 may include only a subset of the features and functionalities that the external application provides when running as a stand-alone application.

One example of an external application is an application for conducting surveys or generating voting polls. This example polling application when operating as a stand-alone application may provide a large range of functionalities related to generating voting polls or surveys; disseminating the voting polls or surveys via email, a webpage, etc.; and analyzing the results. However, a small instance of the polling application implemented within the canvas 202 may only provide the ability to conduct simple voting polls. This is an example of a small instance of an application that provides only a subset of the features available in the full application.

The canvas application may provide application programming interfaces (APIs) for communicating with the external application. Any third-party developer or software producer may create an external application that interacts with the collaboration application (e.g., through the APIs) in order to add the functionality of that external application to the canvas 202. Although only one external application tool 106 is shown in this example UI 100, any number of external application tools 106 may be included in the tool menu 204 or toolbar 104.

Thus, external application tools 106 generally provide specialized functionality that is different from functionality provided by the collaboration application or by a canvas application opened in the canvas 202. External application tools 106 may be added to the collaboration application through a plug-in or other modification and be made available to any canvas application that is opened in the canvas 202. Thus, external application tools 106 are not necessarily tied to or based on the canvas application opened in the canvas 202.

Contextual tools 108 are context-specific tools that may be injected into the canvas 202 based on the needs of the underlying canvas application. For example, if a mapping application is opened in the canvas 202, it may provide a Measure tool and a Map Pin tool that measure distances and mark locations on maps. Different types of tools would be added if a different type of canvas application is opened in the canvas 202. These are examples of extensible tools that may be added to the tool menu 204 or toolbar 104 based on context.

The contextual tools 108 may be created and designated by the canvas application that is opened in the canvas 202. Thus, the definition, icons, name, functionality, etc. of a contextual tool 108 may be provided not by the collaboration application but by the canvas application that is opened in the canvas 202. In general, contextual tools 108 are specific to a single application or a class of applications (e.g., all word processing applications, all mapping applications, etc.) and provide functionality that is related to the features of that canvas application.

Extensible tools may also include tools that are added to a tool selection element based on the usage of the collaboration application. For example, if the collaboration application is configured in a presentation mode, the toolbar 104 or other tool selection element may include tools specific to presentations such as a Laser Pointer tool for indicating a location within the canvas 202 or a Voice Note tool for creating a recorded message. These types of extensible tools may be present in the tool selection element without regard to the specific canvas application(s) opened in the canvas 202 but present based on a configuration or setting of the collaboration application such as a setting for presentation mode.

This example UI 200 of a collaboration application may also include a dedicated region of the UI 208 for presenting content from an external application. This dedicated region of the UI 208 may function as a container that holds the small instance of the external application and may be referred to as a "container." UI elements and data presented in container 208 are provided by the external application independent of the collaboration application or any canvas application opened in the canvas 202. Although only one container 208 is shown, the example UI 200 of external application may include any number of dedicated regions for one or more external applications.

The container 208 may have a specific size and/or shape. For example, the external application may specify a shape and/or size for the container 208. The shape may be a square, rectangle, or other shape. The shape may be defined in terms of an aspect ratio and one or more other characteristics. The dimensions may be defined in terms of pixels, points, centimeters, percentage of screen space, etc. Creation of this container 208 may be implemented based on communication, such as via APIs, between the collaboration application and the external application. In one example, the collaboration application may inform the external application of its total screen size and aspect ratio of the canvas 202 and the external application may respond with a request for a particular size and shape of a region within the canvas 202. In one example, the collaboration application may provide a maximum size of a region that can be dedicated for use by the external application and that external application may indicate how much of that space it will use. The size and shape of the container 208 may vary based on the size of the display, the type of canvas application opened in the canvas 202, and the external application.

The container 208 may be thought of as a pass-through region of the example UI 200 in which the content displayed in the container 208 is received from the external application and input entered is sent to the external application. This enables a user to interact with the external application through the UI 200 without needing to open a separate window or create a different UI. Data entered and received through the container 208 may be managed separately from data entered and received in other portions of the UI 200. In one example, the collaboration application and any canvas application opened in the canvas 202 may not have access to any of the data passing through the dedicated region of the UI 208 for the external application. This type of separation and compartmentalization provides a high level of customization to the UI 200 because there are no limits, other than the size and shape of the container 208, imposed on the content or function provided by the external application. The external application presented in the container 208 may use a different visual theme, different fonts, a different language, different operating system, etc. than the system that presents the collaboration application. These differences may be visually apparent to a user.

An anchor 110 may represent a specific instance of use of the external application tool at a location within the canvas 202. The anchor 110 is a visual representation of the external application tool that is associated with a specific location in a file of a canvas application that is opened in the canvas 202. Activation of this anchor 110 such as by clicking with a mouse, mouseover, touching with a finger on a touchscreen, or other technique can cause the container 208 to appear. If the anchor 110 is moved within the canvas 202, the container 208 also moves. The container 208 may maintain its size and shape when moved.

Figure 3A:
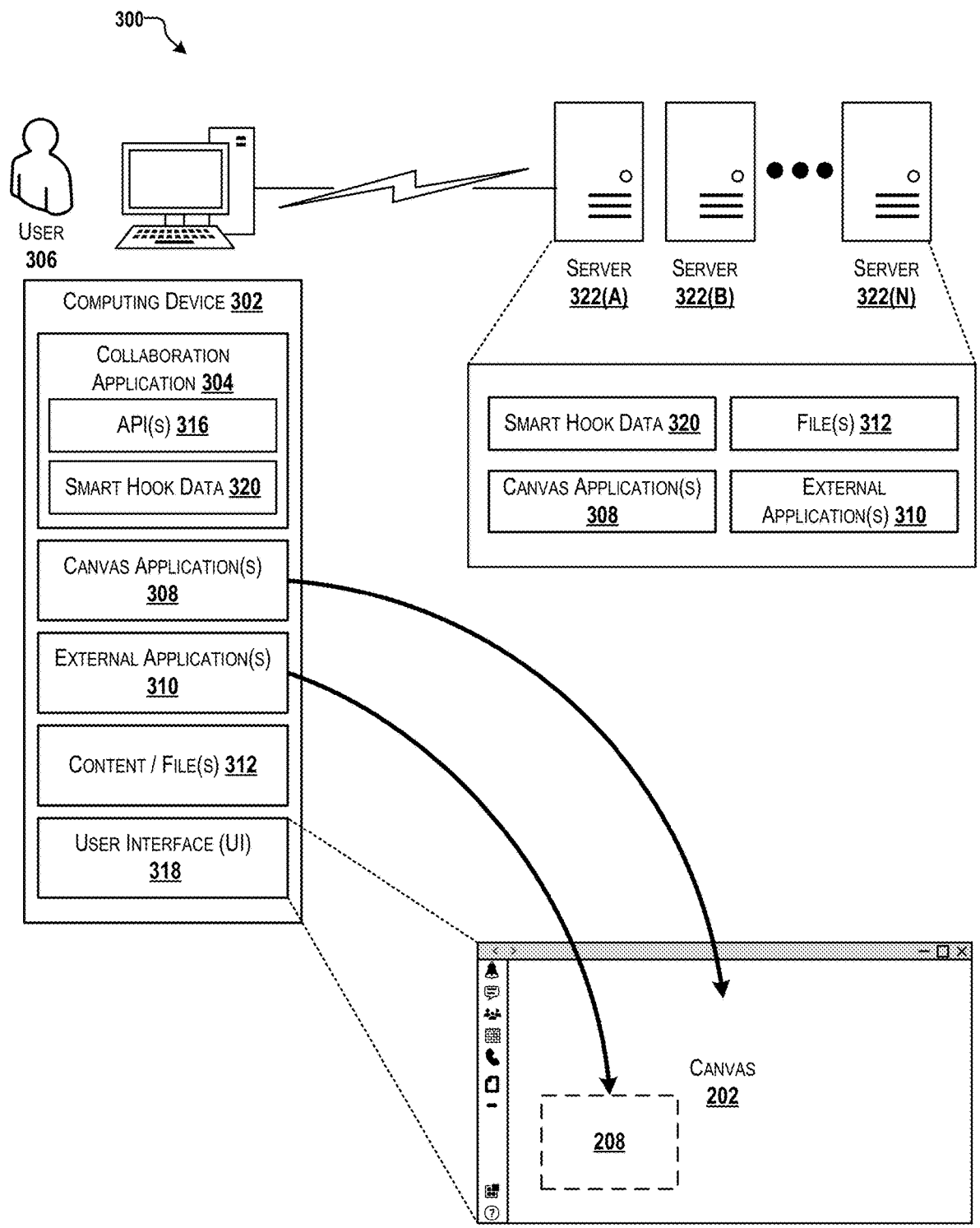
FIG. 3A illustrates an example computing device that provides a collaboration application, canvas application(s), and external application(s).

FIG. 3A shows a block diagram 300 of an example computing device 302 for implementing a collaboration application 304. A user 306 may interact with the computing device 302 to access the collaboration application 304 and other applications such as canvas applications 308 and external applications 310. The computing device 302 may be any type of computing device such as a desktop computer, a laptop computer, a tablet computer, a handheld computing device, etc.

The computing device 302 may include the collaboration application 304. In one example, the collaboration application 304 may be a web-based application or an application hosted on a remote computing device (not shown) such as a server or a cloud-based system. The computing device 302 may also include one or more canvas application(s) 308, one or more external application(s) 310, and one or more sources of content 312 that may be opened in the canvas. The one or more sources of content 312 may be one or more files that may each have an associated data type. For example, the data types may be TXT files, .docx files, DWG files, TSV files, and the like. A datatype may correlate to a file type.

The collaboration application 304 may include a canvas 202 that is able to open a canvas application 308 and present one or more tools. The collaboration application 304 may also include additional functionality such as the ability to manage a voice call, teleconference, group chat, or other collaboration-related tools. One more APIs 316 in the collaboration application 304 allow canvas applications 308 to communicate information about specific contextual tools 108 to the collaboration application 304. Thus, through API(s) 316, for example, a collaboration application 304 may add specific contextual tools 108 to a tool menu 204 or a toolbar 104. Additional APIs 316 enable external applications 310 to add tools to a tool menu 204 or toolbar 104 and to exchange data with the user 306 of the collaboration application 304. APIs 316 accessed by an external application 310 may describe the container 208 that provides the functionality of the tool supplied by the external application 310. The API(s) 316 may allow specification of aspects of the container 208 such as size and shape. The API(s) 316 may also describe the way in which the external application 310 defines location such as by use of a coordinate system or by reference to specific types of objects within a canvas application 308.

A user interface (UI) 318 of the computing device 302 may present the canvas 202 when the collaboration application 304 is an active application on the computing device 302. The canvas 202 may be the same or similar to any of the UI 100 shown in FIG. 1A, the UI 112 shown in FIG. 1B, or the UI 200 shown in FIG. 2. The UI 318 may also present other UIs based on different applications, operating systems, and the like that are active on the computing device 302 such as a UI within from the external application 310 within the container 208.

The computing device 302 may be communicatively connected to one or more servers 322(A)-322(N). The server(s) 322 may provide the computing device 302 and the collaboration application 304 access to software, files, and data structures in addition to those available locally on the computing device 302. For example, any of the smart hook data 302, the content or file(s) 312, the canvas application(s) 308, and the external application(s) 310 may be stored on the server(s) 322 instead of or in addition to being stored on the computing device 302.

Figure 3B:
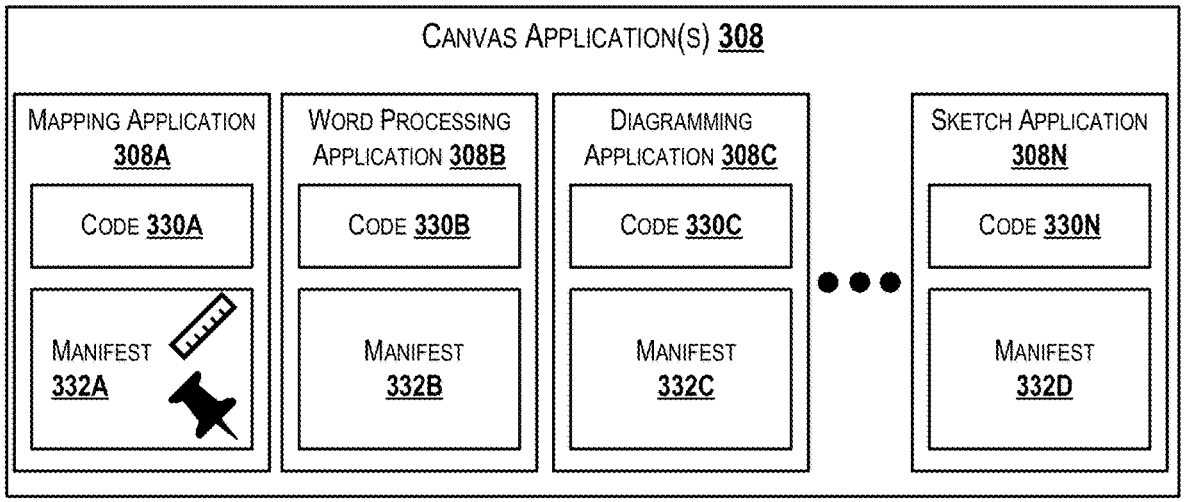
FIG. 3B illustrates examples of canvas applications and examples of external applications.

FIG. 3B shows multiple examples of the canvas application(s) 308 and of the external application(s) 310. The canvas application(s) 308 may be one or more applications, such as productivity applications, that are recognized by the collaboration application 304 and that can be opened in the canvas 202. Examples of canvas application(s) 308 include but are not limited to a mapping application 308A, a word processing application 308B, a diagramming application 308C, a sketch application 308N, and the like, any of the canvas application(s) 308A-308N may include code 330A-330N that provides the instructions for the computing device 302 to run the respective canvas application 308. The code 330 may be executed to run the canvas application 308 as a stand-alone application. The code 330 or a subset of the code 330 may be executed when the canvas application 308 is opened within the application 304.

The manifests 332A-322N of the canvas applications 308A-308N include data that describes how opening a canvas application 308 into the canvas 202 may change the tool selection elements in the tool menu 204 or the toolbar 104 shown in FIG. 2. Any contextual tools 108 provided by canvas application(s) 308 can be described in the manifest 332. The manifest 332 may provide icons, names, or other extensible control representing the contextual tool 108 for use in the tool menu 204 or the toolbar 104. In one example, the manifest 332 may also indicate one or more of the canvas tools 306 to remove from the tool selection element. For example, the manifest 332 may instruct the collaboration application 304 to remove the highlighter tool from the set of canvas tools 306 when the mapping application 322 is opened in the canvas 314.

The manifest 332 for any canvas application 308, made declare that the canvas application 308 is a member of a class of applications. Specific classes of applications may be associated with a particular toolset. For example, any application that declares itself as a mapping application and not just this specific mapping application 308A may be associated with a toolset that includes the Measure tool and the Map Pin tool. As an additional example, any canvas application 308 that declares itself as a sketch application 308N may be associated with a predetermined toolset relevant to graphics applications.

By using the manifest 332 to declare association with a class of applications, the canvas application(s) 308 do not have to identify specific tools but can leverage a pre-defined relationship between a class of applications and one or more contextual tools 108. The set of contextual tools 108 that are associated with a given class of applications may be maintained by the collaboration application 304. Thus, these contextual tools 108 may reside within the collaboration application 304 and be included in the canvas 202 whenever an application of the specified class is opened in the canvas 202.

The manifest 332 may declare that that canvas application 308 is a member of a class of applications and may also specify one or more additional tools specific to that particular application. Thus, the contextual tools 108 available in the tool menu 204 or the toolbar 104 FIG. 2 may come from the canvas application 308 and/or from tools maintained by the collaboration application 304 for a particular class of applications.

The external application(s) 310 may include one or more applications that are not opened in the canvas 202 but that may be used within the collaboration application 304. One example of an external application 310 is a polling application 310A that is used to conduct voting polls or surveys. The polling application 310A provides one or tools (e.g., a tool to take a voting poll) that add functionality to the collaboration application 304. This functionality, such as the ability to conduct a voting poll, is in addition to functionality provided by the collaboration application 304 itself or that of any of the canvas application(s) 308. The polling application 310A provides an extensible control 336A representing the tool. The extensible control 336A representing the tool may be implemented as an icon for inclusion in the toolbar 104, text for inclusion in a tool menu 204, or any other way of graphically representing a control for tool within a UI through text, pictures, symbols, etc.

The polling application 310A also includes code 338A that, when executed, implements the functionality of the polling application 310A. The code 338A may be opened and run by the computing device 302 or it may be run by a website or other remote computing device. The code 338A, in this example, may provide the functionality for generating and collecting responses to a voting poll. This may be a subset of the code that is used for the polling application 310A when operated as a stand-alone application separate from the collaboration application 304. The polling application 310A also provides tool identifiers (ID) 340A for any tools provided by the polling application 310A. A tool ID 340 provides a unique label or name for a specific instance of the use of a tool. Thus, in the context of the polling application 310A, the tool ID 340 identifies the contents of the voting poll such as the questions and the possible answers as well as any data received in response to the voting poll. Because each tool ID 340A is unique to a specific instance of the tool, there may be multiple tool IDs 340A maintained by the polling application 310A.

Other examples of external applications 310 include a workflow application 310B and an encyclopedia application 310N. The workflow application 310B manages assignment of tasks and responsibilities to users as well as tracking the progress on those tasks. The workflow application 310B may include a graphical element 336B, code 338B and tool ID(s) 340B. The encyclopedia application 310N provides content such as articles or definitions from an encyclopedic source of information such as a wiki or on-line encyclopedia. The encyclopedia application 310N may also include a graphical element 336N, code 338N and tool ID(s) 340N.

Returning to FIG. 3A, each use of a tool may be associated with a specific "location" or display of content of a file opened in the canvas 202. A linkage ("association") between the tool, the location of use, and any content specific ("supplemental content") to that particular usage may be maintained through a "smart hook." A smart hook is a data structure that associates a tool with the displayed content in the file opened in the canvas 202. The smart hook contains the data needed to re-create in the canvas 202 the association between the canvas 202, a canvas application 308, specific content 312 such as a webpage or a file, a location of displayed content from the file, and the tool. In one example, smart hook data 320 may be stored and managed by the collaboration application 304. However, the smart hook data 320 may alternatively be stored by one of the canvas application(s) 308 that supplies the tool referenced in the smart hook data 320. The smart hook data 320 contains data that is sufficient to stitch together a specific instance of tool usage and the specific displayed content from a file but does not necessarily contain any data from the files or applications. In other words, a smart hook may provide the "who" and the "where" but not the "what." The smart hook data 320 may contain data for any type of tool such as a canvas tool 206, an external application tool 106, or a contextual tool 108.

Figure 4:
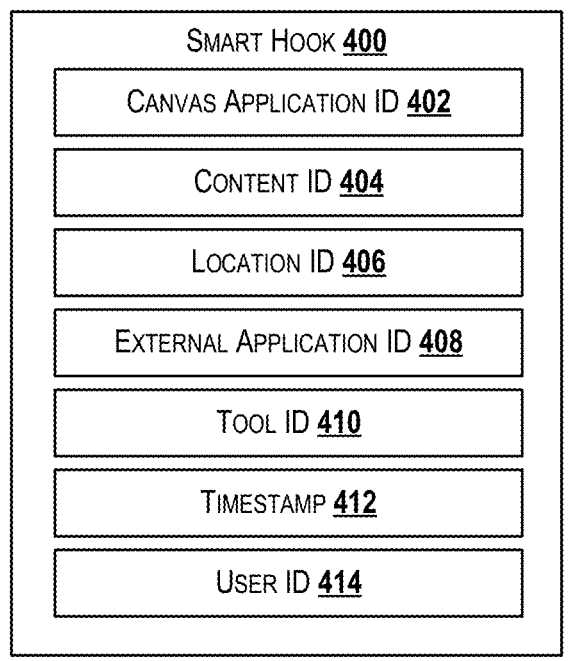
FIG. 4 illustrates an example data structure for a smart hook that links a specific instance of a tool with a specified location on an application in a canvas.

FIG. 4 shows an example data structure of a smart hook 400. A smart hook may also simply be referred to as a "hook." A smart hook 400 represents a hook between a tool and a canvas that implicitly links one to the other by stitching an instance of the tool to a particular position on a UI generated by the collaboration application such as the canvas 202 shown in FIGS. 2 and 3A. Smart hooks 400 used to implement this stitching may be managed and stored by the collaboration application. APIs may define the features of a smart hook 400 and provide applications using the APIs with a common language to communicate the type and structure of data that makes up a smart hook 400.

A smart hook 400 may include an application identifier (ID) 402. The canvas application ID 402 identifies a specific canvas application 308. The canvas application ID 402 may identify, for example, a specific word processing application, a specific graphics application, a specific drawing application, a specific spreadsheet application, or another type of application. A content identifier (ID) 404 included in the smart hook 400 identifies specific content that may be opened in the canvas such as file or a webpage. Stated differently, the content ID 404 identifies a specific canvas in terms of the content that is opened in the canvas when that canvas is active. By way of example, the canvas application ID 402 may identify a diagramming application and the content ID 404 may then identify a chart file that is opened by diagramming application.

A location identifier (ID) 406 is also included in the smart hook 400. The location ID 406 identifies a location in the file represented by the file ID 404. The location within the file may be represented in any number of ways. The location ID 406 represents location in a way that is understood by both the collaboration application and any canvas application or external application supplying a tool for pinning on the canvas.

In one example, location may be represented through a set of coordinates that indicate a position on the file relative to a coordinate system. For example, location may be represented as a set of x-, y-coordinates with the origin of the coordinate system (0, 0) set to the center of the canvas. Use of a set of coordinates may be a default way to represent location in the absence of any other technique or standard for conveying location information. The canvas application represented by the canvas application ID 402 may specify the manner in which location is represented. When location is represented through a set of coordinates, that location may remain the same within the UI presented by the collaboration application even if content or position of the underlying file changes.

In one example, location may be linked to a commonly understood object in the file represented by file ID 404. The type of object may vary depending on the type of application as represented by the canvas application ID 402. For example, in word processing applications the object may be a paragraph, a page and line number, a textual phrase, a single word, or the like. As a further example, in a mapping application the object may be a geographic landmark or geolocation such as latitude and longitude. Note that although latitude and longitude represent a coordinate system, this coordinate system is based on the content contained within the canvas application (i.e., a particular map) which is different from a coordinate system representing a UI generated by the collaboration application. As a further example, a diagramming application may use elements of a chart such as squares, rectangles, circles, lines, etc. as the commonly understood objects. When location is tied to a commonly understood object in the file, the location will change within the UI presented by the collaboration application as the position of that object changes. Thus, any tool pinned to that object with the smart hook 400 will move as the object moves.

Smart hook 400 may also include an external application identifier (ID) 408 if the smart hook 400 references a tool supplied by an external application. The external application ID 408 indicates the specific external application. For example, the external application ID 408 may indicate that the smart hook 400 refers to an object created by the polling application rather than some other external application.

The tool identifier (ID) 410 in the smart hook 400 identifies a specific instance of tool usage. The tool ID 410 may also provide a pointer to or other indication of content associated with the tool usage. For example, if the tool is a Sticky Note tool, then the tool ID 410 may indicate where the content of the sticky note is located. Thus, the tool ID 410 indicates how the tool was used in one specific instance rather than just the name or identity of the tool.

The smart hook 400 may also include a timestamp 412 and a user identifier (ID) 414. The timestamp 412 indicates the time and/or date of creation of the association between a tool and a location in an application. The user ID 414 indicates the user (e.g. user 306) who created the association represented by the smart hook 400. The timestamp 412 may be used for managing different versions of a smart hook 400. The user ID 414 may be used for providing the correct tool-file linkages for the user associated with the user ID 414.

Figure 3B:
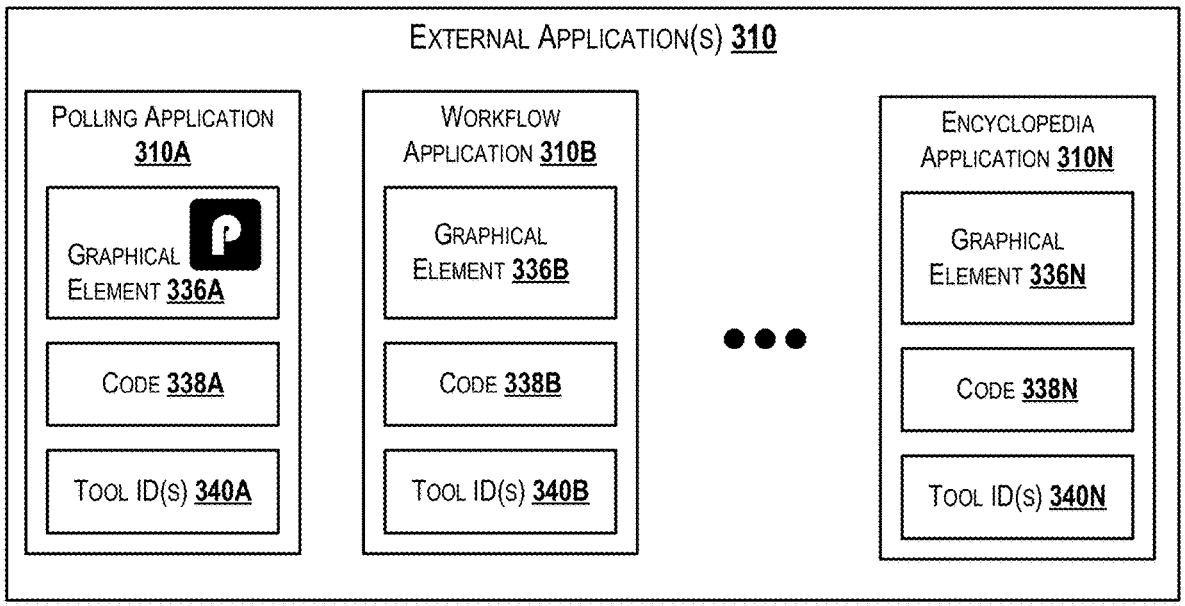

In one example, smart hook data 242 may be stored locally on the computing device 302 as shown in FIG. 3, for example as the smart hook data 320. However, the smart hook 400 may alternatively or additionally be stored remotely on a network or cloud-based storage location. When the smart hook 400 is stored in a network-accessible location and not only on local storage of the computing device 302, the user represented by the user ID 414 may be able to access his or her smart hooks 400 (i.e., and have the tools pinned in locations he or she selected in a given file) from any computing device that is able to access the storage location. The smart hook 400 may additionally or alternatively be associated with the file represented by the file ID 404 so that any user opening this file in a canvas of the collaboration application will see a tool pinned at the location indicated by the smart hook 400.

Figure 5A:
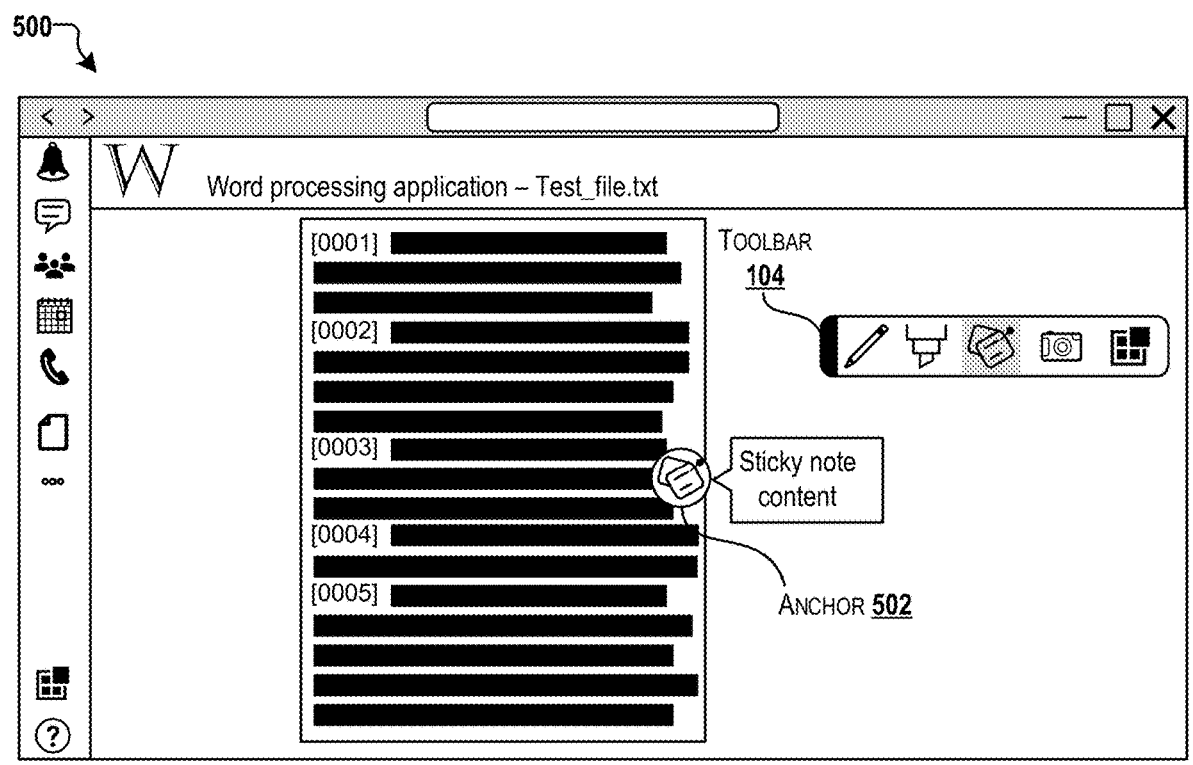
FIG. 5A illustrates a first view of a UI showing a tool icon pinned to a paragraph of text in a word processing document.
Figure 5B:
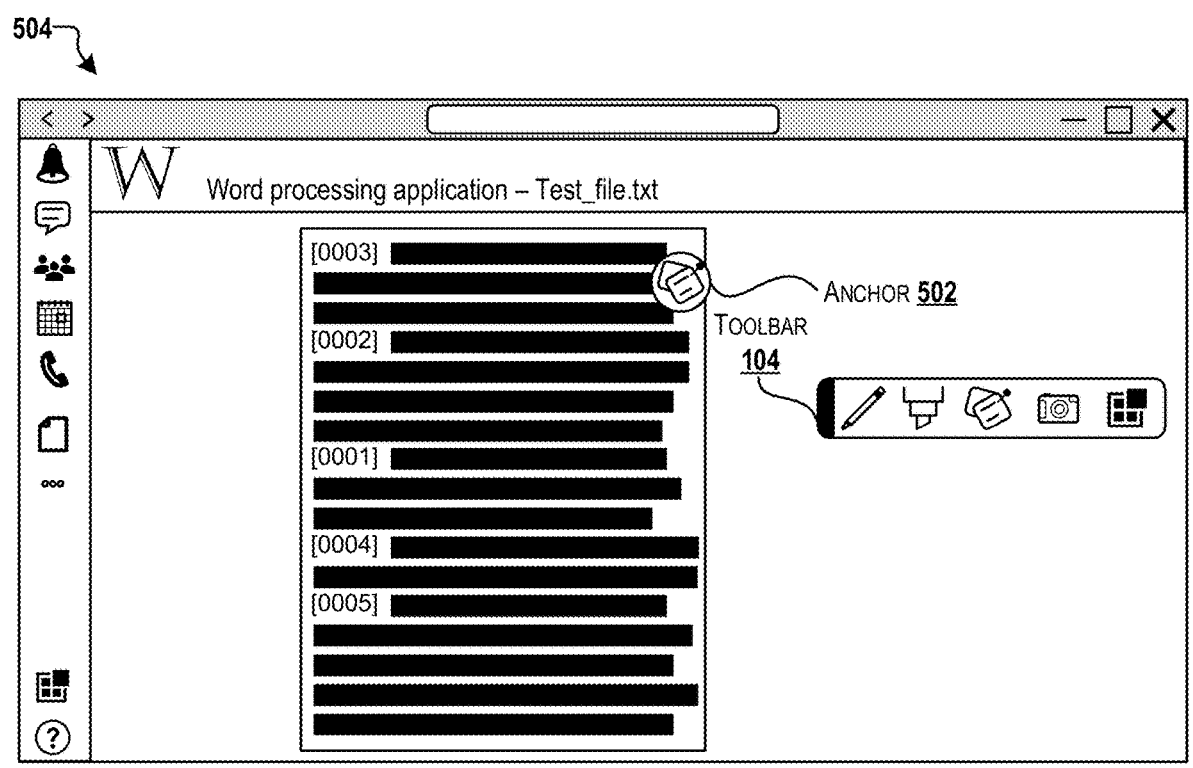
FIG. 5B illustrates a second view of the UI of FIG. 5A showing the tool icon moved together with the associated paragraph of text to a different location on the UI.

FIGS. 5A and 5B illustrate two views of a collaboration application UI that shows how a pinned location of a tool moves together with the underlying content of a file opened in a canvas of the collaboration application. Example UI 500 presents a first view of a word processing application opened in a canvas of the collaboration application. In this example, there is a pinned anchor 502 that represents a Sticky Note tool. The Sticky Note tool may be an example of a canvas tool 206 introduced in FIG. 2. The anchor 502 is a visual representation of a tool that is associated with a specific location in the file opened in a canvas. The visual representation may have, but is not limited to, the appearance of the head of a pin and may include an icon associated with the tool that is the same or similar to an icon for that tool displayed in a toolbar 104.

Example UI 504 shows a second view of the word processing application in which the anchor 502 has moved together with paragraph [0003] of the word processing file. In this example, the paragraph of the word processing file is the object to which this instance of the Sticky Note tool is pinned. An API such as the API 316 shown in FIG. 3 may specify that paragraphs are the object type to be used to define location within the word processing application. With this association created between the anchor 502 and the object in the file, the anchor 502 is not stuck at a fixed location within the canvas but changes position according to changes in location of the associated object (i.e., paragraph [0003]). This is an example of a tool being pinned to a commonly understood object within a file opened in the canvas.

Figure 6A:
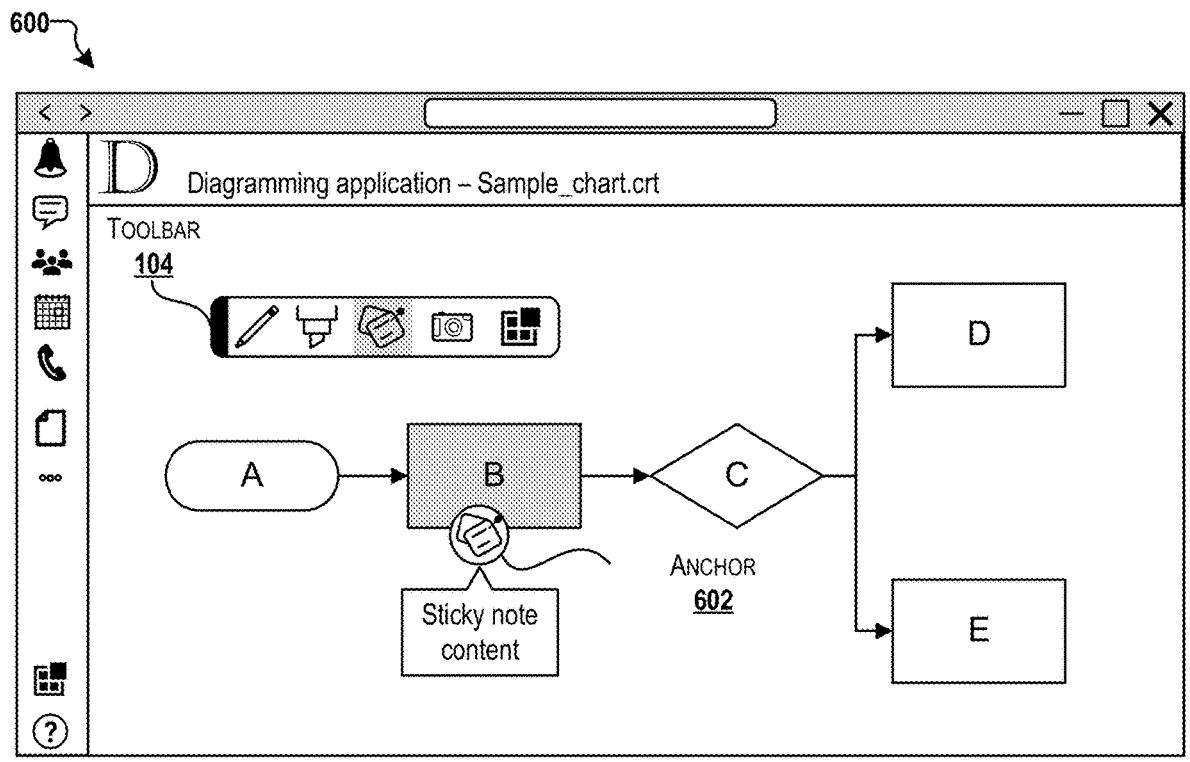
FIG. 6A illustrates a first view of a UI showing a tool icon pinned to an object in a chart document.
Figure 6B:
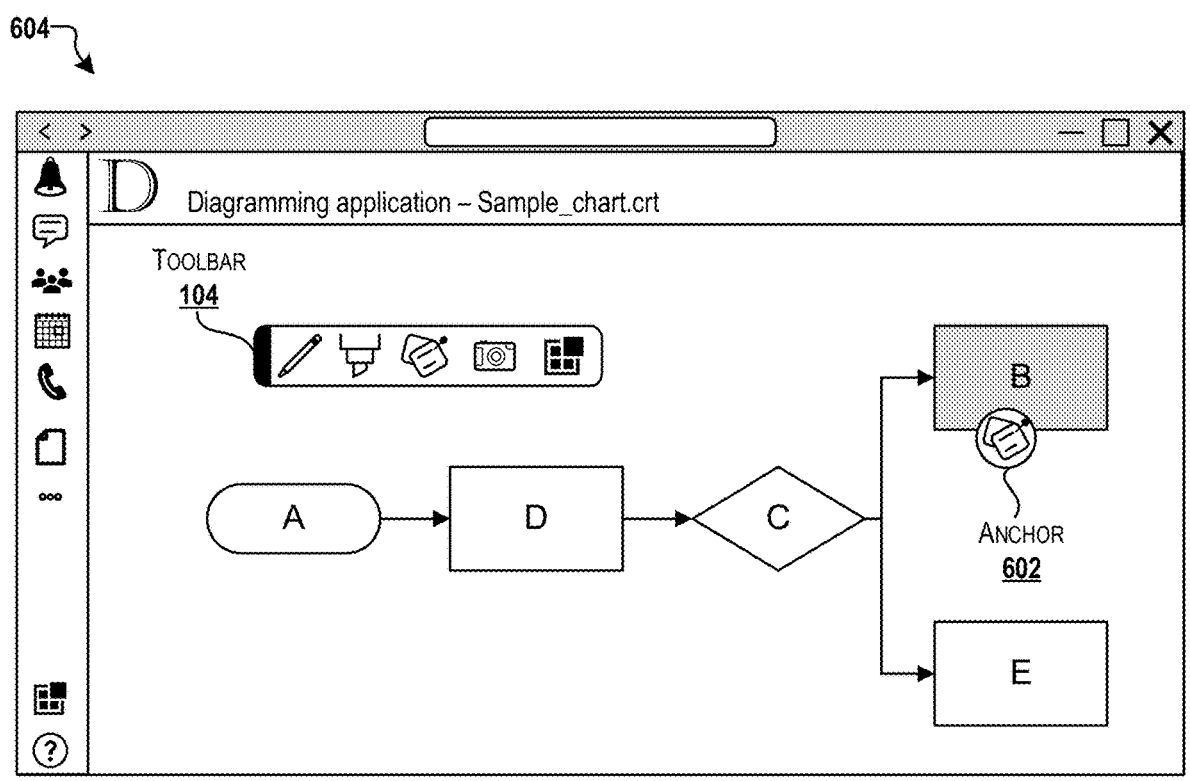
FIG. 6B illustrates a second view of the UI of FIG. 6A showing the tool icon moved together with the associated object to a different location on the UI.

FIGS. 6A and 6B illustrate two views of a collaboration application UI that shows how the pinned location of a tool moves together with the underlying content of a file opened in a canvas of the application. Example UI 600 presents a first view of a diagramming application that includes a toolbar 104. In this example, there is an anchor 602 associated with a chart object (rectangle "B"). The anchor 602 represents a Sticky Note tool.

In FIG. 6B, example UI 604 shows the anchor 502 moved to a different position within the UI 604 relative to the UI 600 of FIG. 6A because the object that the tool is pinned to has moved to a different location within the chart file. The associated object, rectangle "B," may be represented by a unique object identifier or code within the diagramming application. This unique object identifier or code may be the location ID 406 included in a smart hook that stitches this instance of the Sticky Note tool to rectangle "B".

Figure 7A:
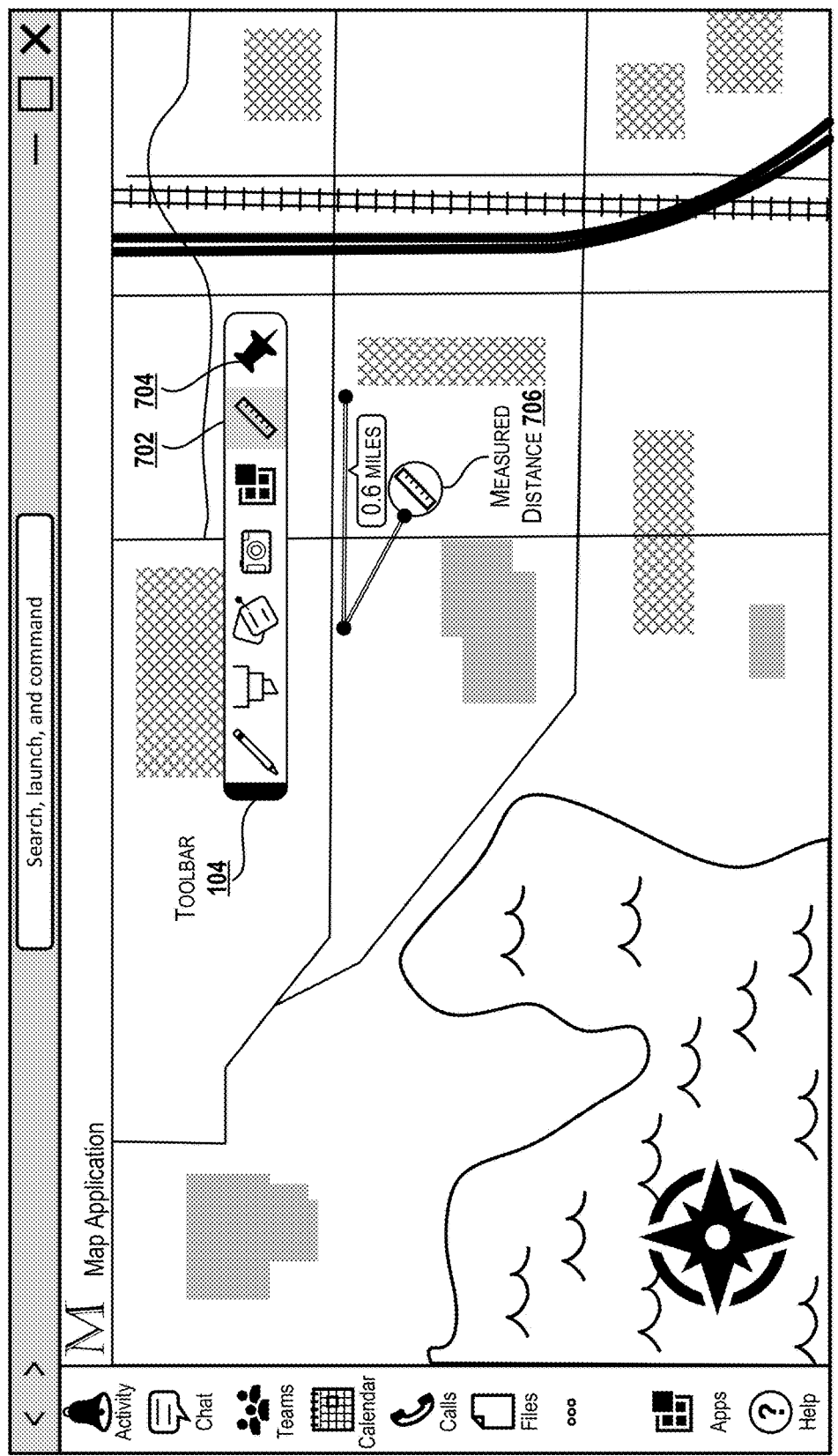
FIG. 7A illustrates an example UI presenting a map application with a toolbar that includes a Measure Tool and a Map Pin Tool specific to the map application.
Figure 7B:
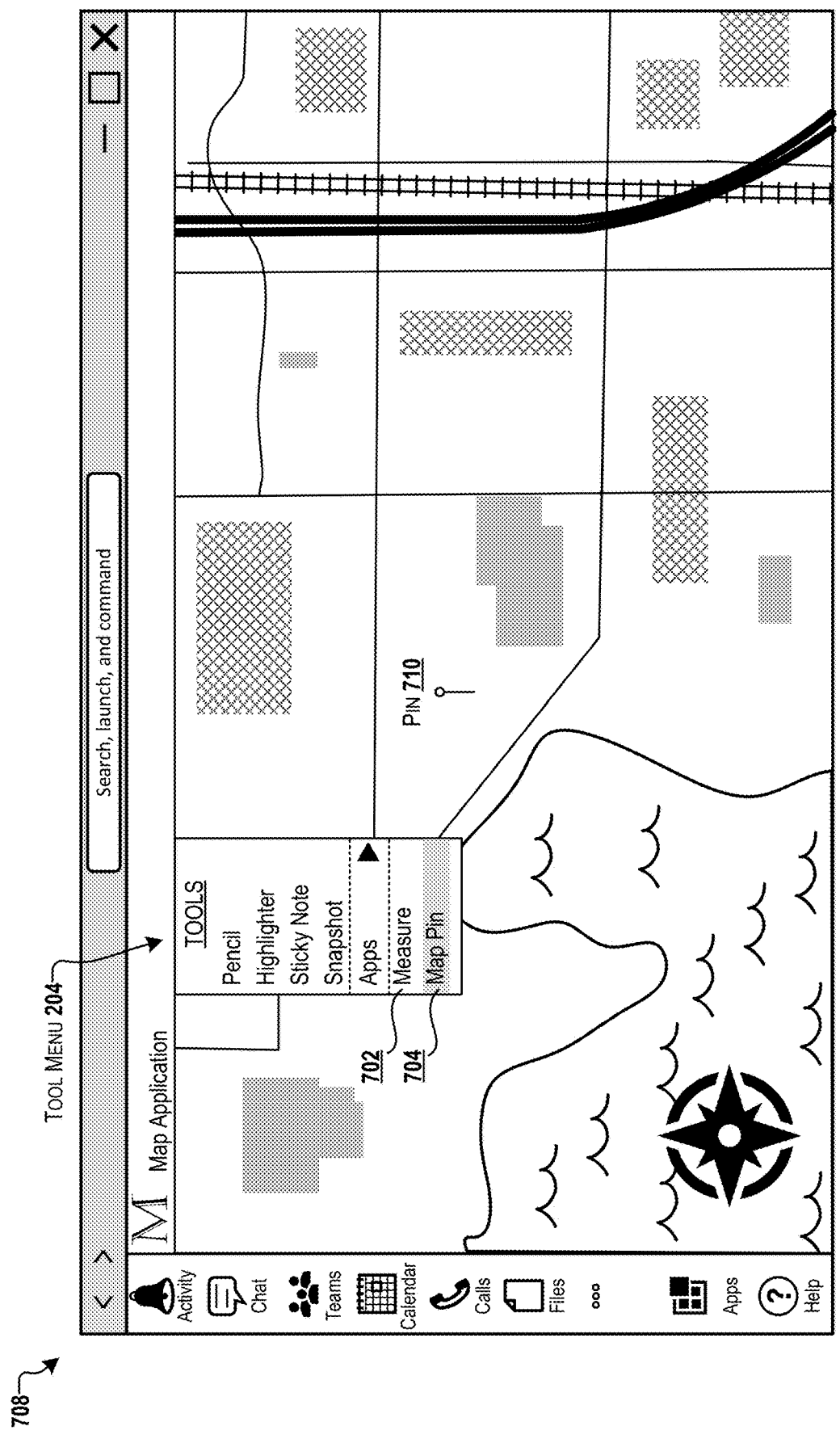
FIG. 7B illustrates an example UI presenting a map application with a tool menu that includes a Measure Tool and a Map Pin tool specific to the map application.

FIGS. 7A and 7B show examples of a map application in which contextual, map-specific tools associated with the map application are presented in the UI of the collaboration application either through a toolbar 104 or a tool menu. FIG. 7A shows an example UI 700 in which a map application is opened in the canvas of a collaboration application. The map application is associated with specific tools that are not part of the general toolset presented by the collaboration application. These tools are examples of the contextual tools 108 introduced earlier. The tools are shown in this example UI 700 as part of a toolset in a toolbar 104.

The toolbar 104 in this example UI 700 includes a Measure tool 702 represented by a ruler icon and a Map Pin tool 704 represented by a pushpin icon. These are tools that are not included in toolbars presented with other types of applications such as, for example, the word processing application shown in FIGS. 5A and 5B. The Measure tool 702 may perform a function specific to maps such as measuring distances between two points. The example UI 700 shows an example use of the Measure tool 702 to generate a measured distance 706. The functionality provided by the Measure tool 702 may be available to the map application only when opened in the canvas of the collaboration application.

FIG. 7B shows an example UI 708 which includes the same map application and map file shown in FIG. 7A. In this example UI 708, tools are shown in a tool menu 204 instead of the toolbar 104. The tool menu 204 is also an example of a tool selection element. The tool selection element may be implemented using any variety of UI designs and interface options and is not limited to a toolbar 104 or a tool menu 204. This example UI 708 shows use of the Map Pin tool 704. The Map Pin tool 704 may be used to designate a location on the map file opened within the collaboration application. For example, the Map Pin tool 704 may be used to place a pinned tool 808 at a location on the map. The location of the pinned tool 808 within the map file may be represented using a commonly understood object such as a street address or a geolocation.

The Measure tool 702 and the Map Pin tool 704 shown in FIGS. 7A and 7B may be described within a manifest associated with the map application such as the manifest 332 shown in FIG. 3. In one example, a plug-in in the collaboration application may reference the manifest 332 to obtain any tools associated with the map application. In one example, the manifest 332 may be presented to the collaboration application through an API. The manifest 332 provides instructions to modify the tool selection element to include extensible controls 336 representing the Measure tool 702 and the Map Pin tool 704 (e.g., icons for inclusion in the toolbar 104 or text for inclusion in the tool menu 204).

Figure 8A:
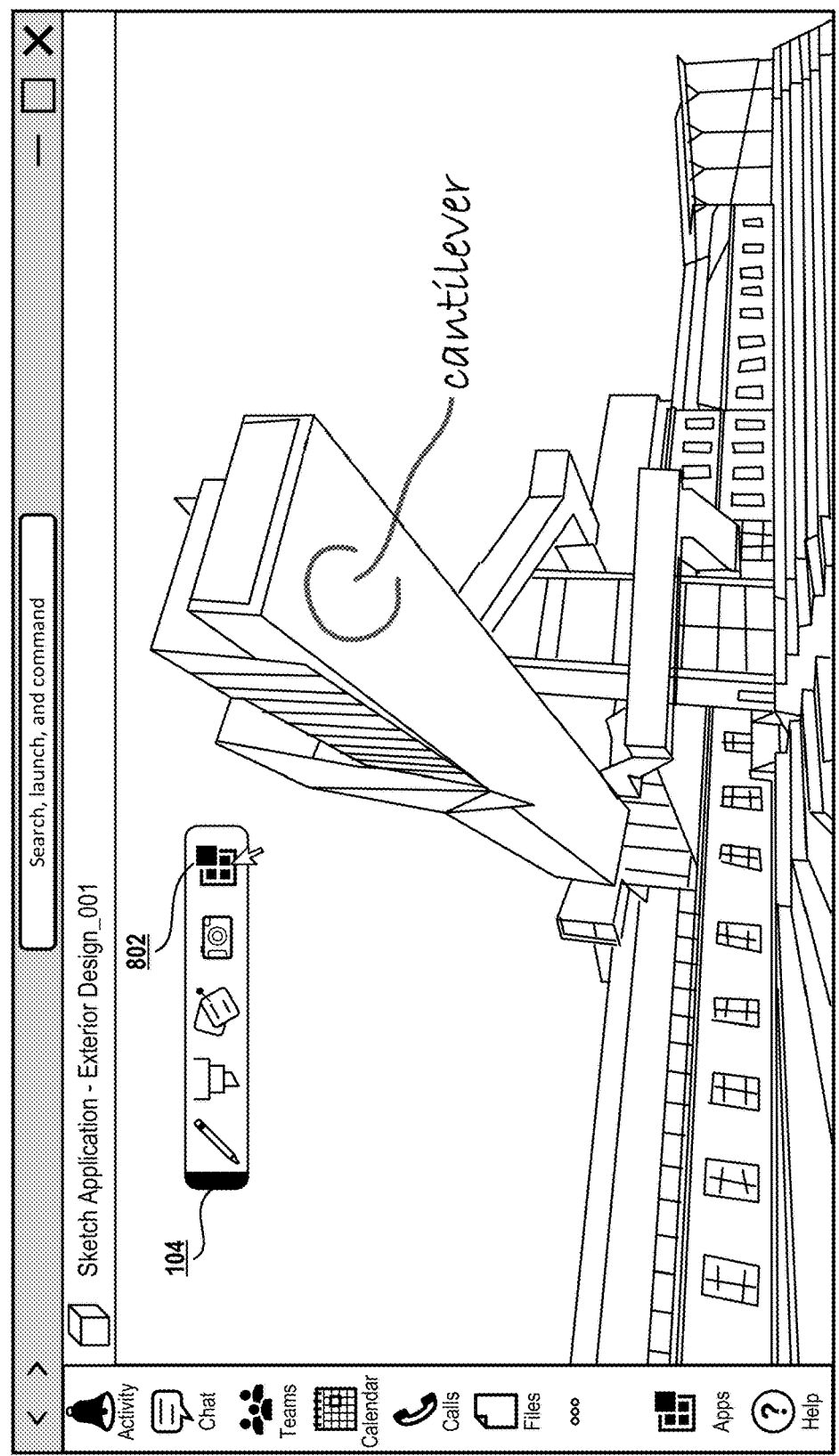
FIG. 8A illustrates an example UI presenting a sketch application in a canvas with an extensible toolbar.
Figure 8B:
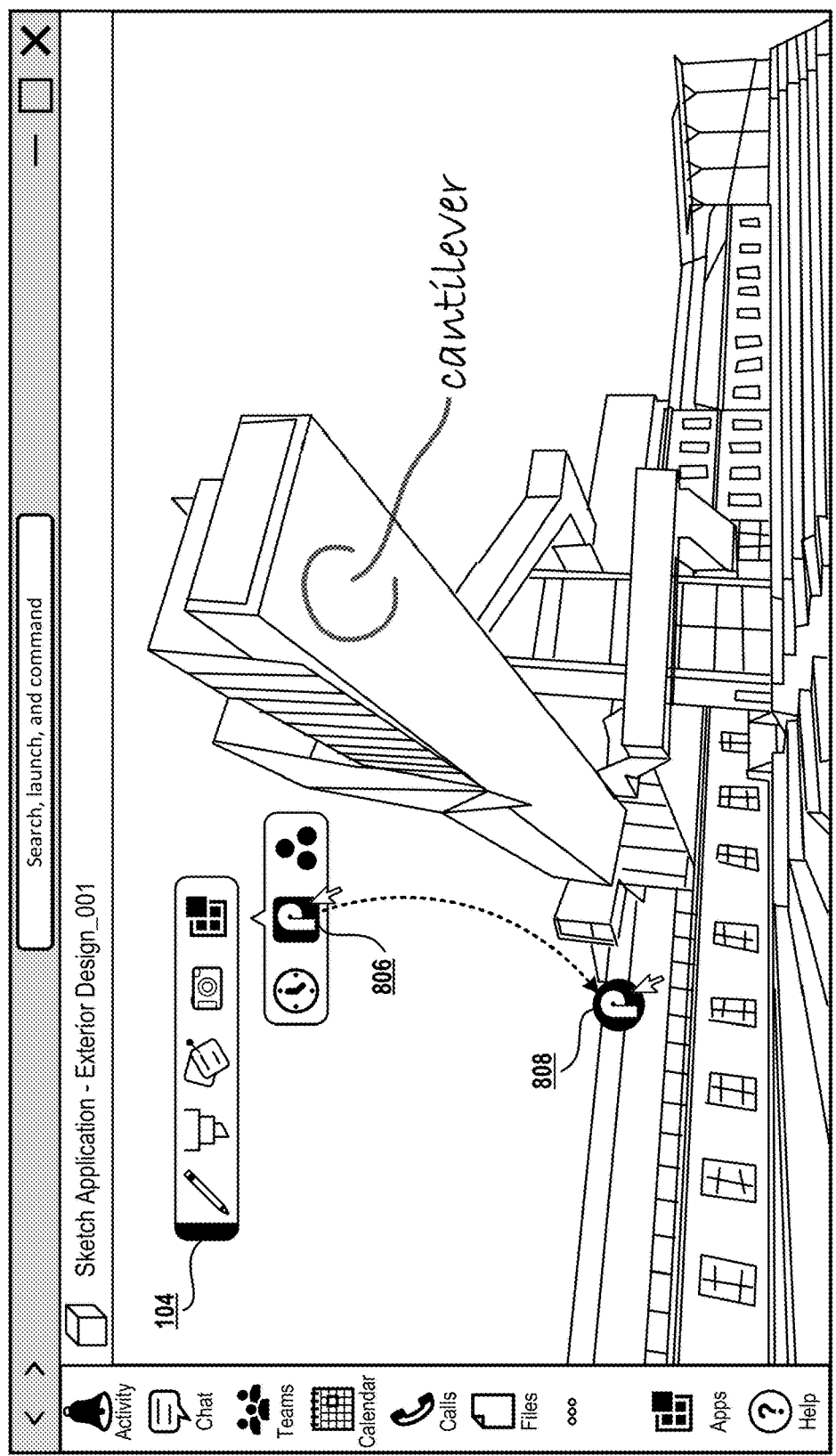
FIG. 8B illustrates the example UI of FIG. 8A with the toolbar expanded showing multiple icons representing external applications and pinning a tool icon representing one of the external applications to a location on a drawing opened in the sketch application.
Figure 8C:
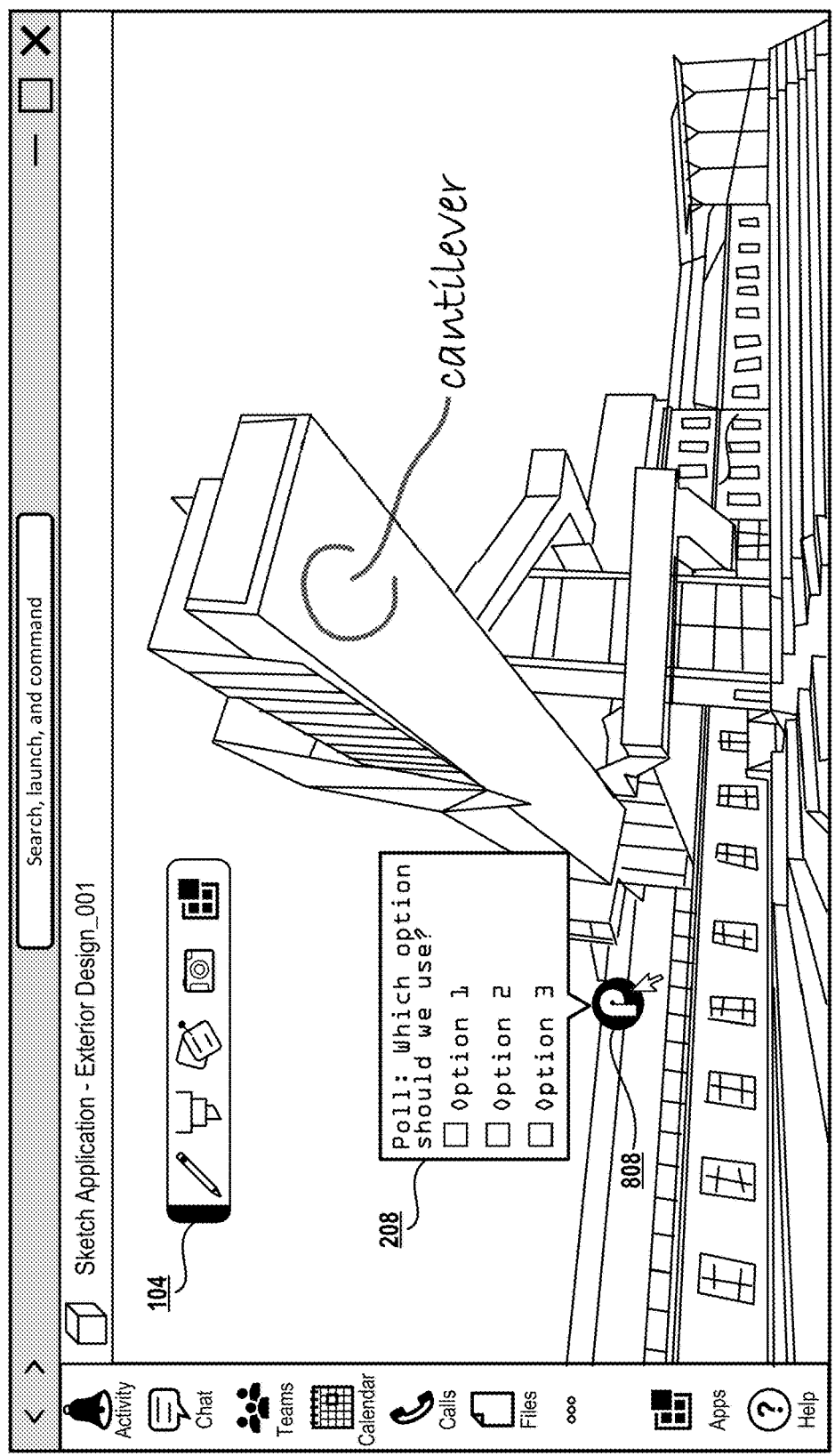
FIG. 8C illustrates the example UI of FIG. 8A showing the tool icon representing the external application expanded to create a container for presenting data provided from the external application.

FIGS. 8A, 8B, and 8C show a sketch application that has opened a file containing a sketch of the exterior of a building within a canvas of a collaboration application.

FIG. 8A shows an example UI 800 that includes a toolbar 104 within the canvas of the collaboration application. The toolbar includes a "tools" icon 802 to display additional tools beyond those shown in this view of the toolbar 104. Activating the "tools" icon 802 through use of a pointing device such as a mouse or finger or through use of keyboard or voice commands expands the toolbar 104 to show additional tool options.

FIG. 8B shows an example UI 804 in which the toolbar 104 is expanded to show three external application tools. The external application tools may include a polling tool represented by an icon 806 in the expanded toolbar. This icon 806 may be selected and associated with a location on a file in the canvas to create a pinned tool 808 that associates an instance of the polling tool with a location on the exterior design sketch. The pinned tool 808 may be represented by an icon that is the same or similar to the icon 806 that represents the polling tool in the toolbar 104. The association of the polling tool with the location on the file may be captured by the collaboration application and is recorded by the collaboration application as a smart hook. In some example implementations, the canvas application rather than the collaboration application may create and/or store the smart hook.

FIG. 8C shows an example UI 810 in which activation of the pinned tool 808, such as by selection or mouseover, opens a container 208 for the polling application. The pinned tool 808 may be added to the UI 810 at its original location (i.e., the location set in FIG. 8B) when the sketch application is re-opened in the collaboration application. For example, the UI 810 shown in FIG. 8C may represent a later session that comes after a first session represented by the UI 804 of FIG. 8B is closed.

The container 208 presents content that is provided by the polling application. This content may be presented without modification by the collaboration application and may appear different from other parts of the example UI 810 such as by having a different style, font, color scheme, resolution, language, etc. In this example, the container 208 presents a voting poll with three choices. User selection of one of the choices creates data that is passed to the polling application and may be saved by the polling application in association with the pinned tool 808. Subsequent activation of the pinned tool 808 may call the data from the polling application and present the results of the voting poll within the container 208. Thus, clicking or otherwise activating the pinned tool 808 launches the functionality of the external application represented by the pinned tool 808. This enables use of at least a portion of the functionality of the polling application from within the canvas application (i.e., the sketch application) without having to separately launch the polling application or open an additional window.

Figure 9:
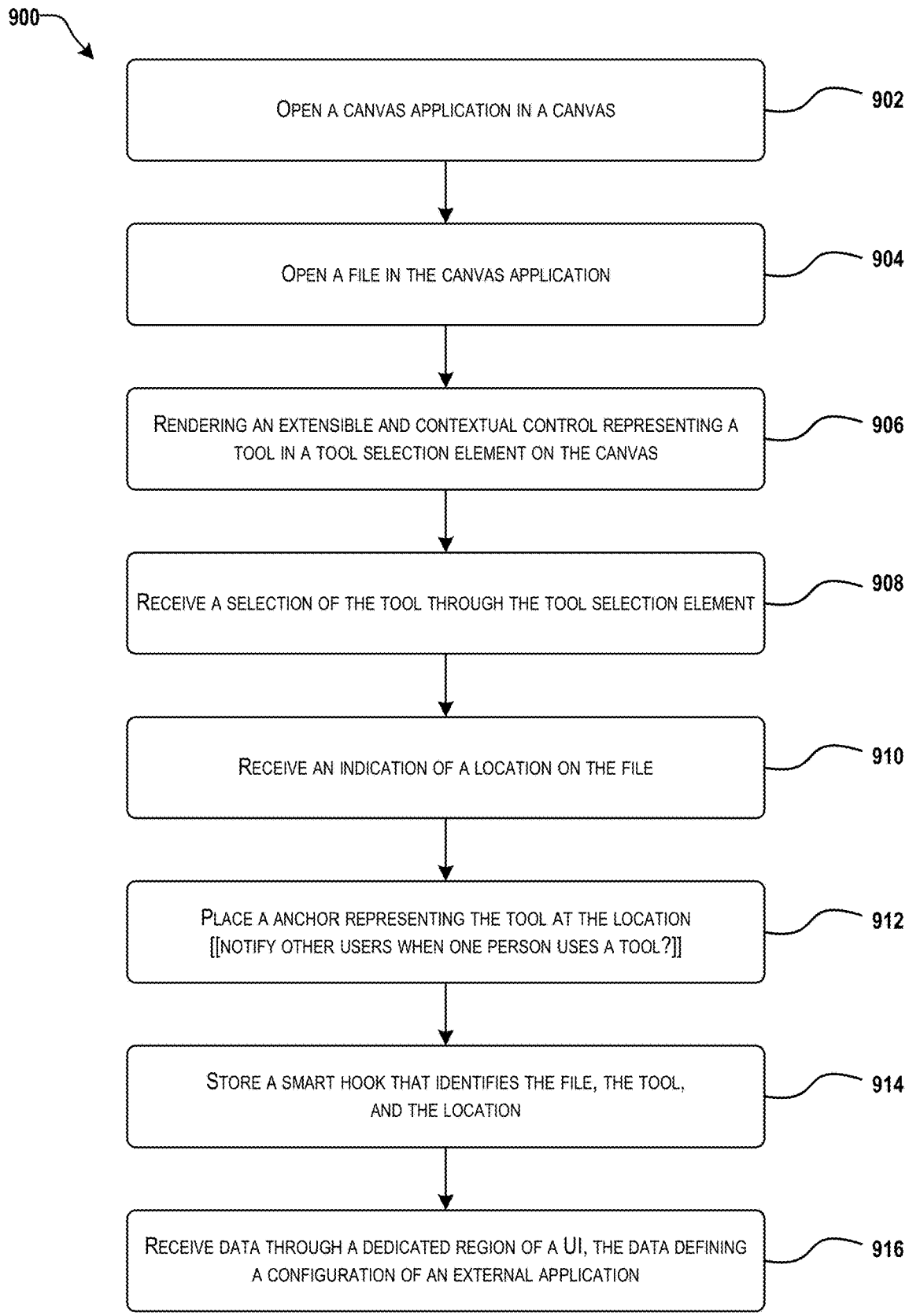
FIG. 9 is an example flow diagram illustrating selection of a tool and pinning an anchor representing the tool at a location on content opened in a canvas of a collaboration application.
Figure 10:
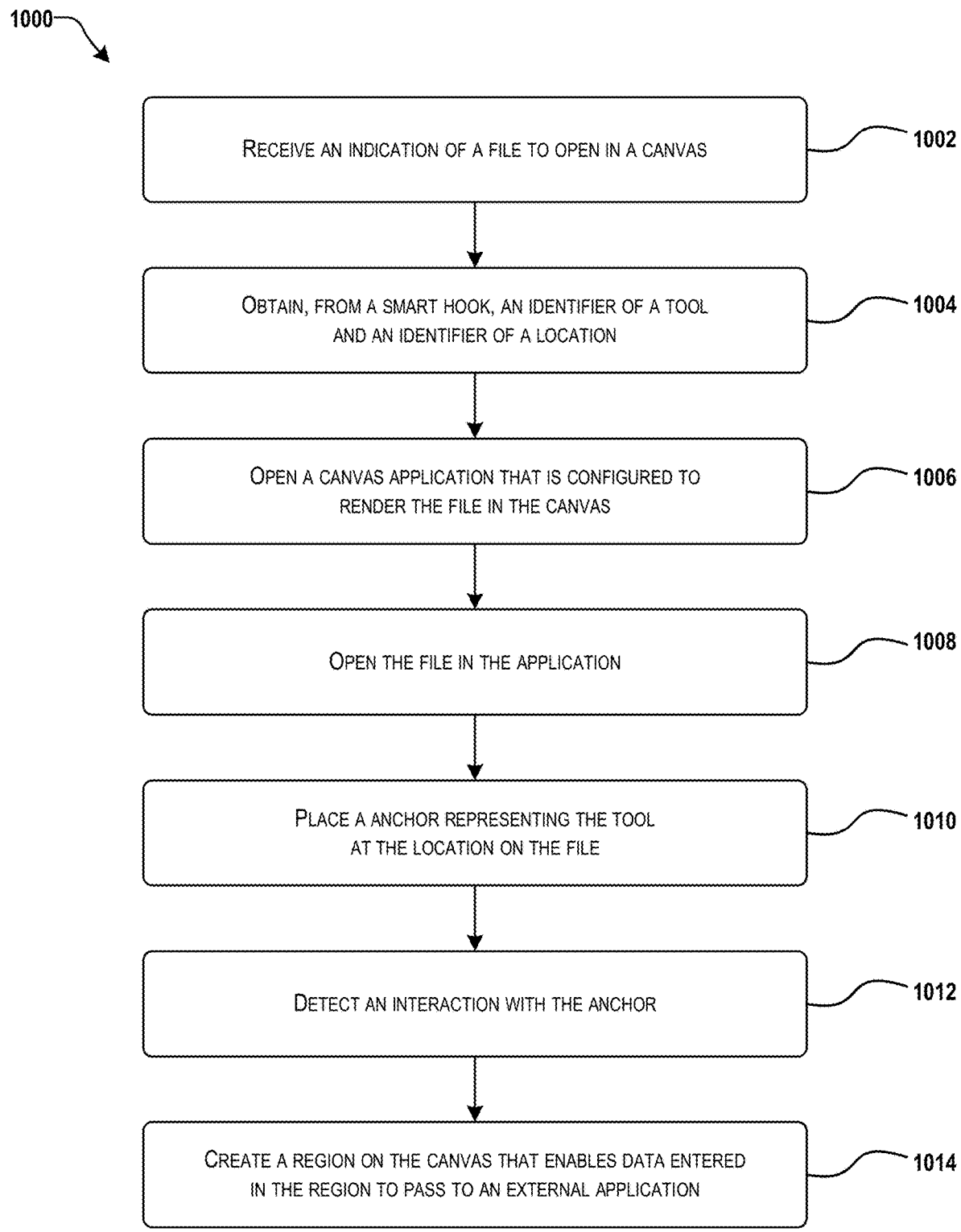
FIG. 10 is an example flow diagram illustrating placement of an anchor representing a tool at a previously specified location on content upon opening the content in a canvas of a collaboration application.

FIGS. 9 and 10 are diagrams illustrating aspects of routines 900 and 1000 related to extensible tools and pinning tool objects onto canvases in collaborative applications. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

Additionally, the operations illustrated in FIGS. 9 and 10 can be implemented in association with the example presentation UIs described above. For instance, the various device(s) and/or module(s) described herein can generate, transmit, receive, and/or display data associated with the content of a canvas, tool, and/or external application.

FIG. 9 shows a routine 900 for pinning an anchor representing an external application on a canvas of a collaboration application. Routine 900 also includes operations for "dehydrating" a relationship between a canvas, an application, a location of displayed content of the file and a tool by creating a smart hook. Dehydration, as used herein, refers to storing multiple pointers to other data in relation to each other without necessarily storing all of the other data itself.

At operation 902, a canvas application is opened within a canvas of a collaboration application. The canvas application may be a productivity application or another type of application including any of the types of applications discussed previously in this disclosure. Opening of a canvas application within a collaboration application may be performed by a user selecting the canvas application from a menu of the collaboration application that presents a choice of applications previously associated with the collaboration application. Opening a canvas application may cause the canvas application to occupy all or significantly all of the canvas portion of a UI presented by the collaboration application.

At operation 904, a file is opened in the canvas application. Opening a file in a canvas application may cause the content of the file to be presented within the canvas of the collaboration application. A canvas application may be able to open one or more file types. The specific file type(s) depends on the canvas application.

At operation 906, an extensible control representing the tool of the external application is rendered in a tool selection element displayed in the canvas. The extensible control may be selected based on a data type of a file. Thus, the type of file may determine which types of extensible controls are available in a UI. The tool selection element may be a toolbar, a tool menu, or another type of extensible control. In one example, the tool selection element may also include at least one of an extensible control representing a canvas tool or an extensible control representing a contextual tool. The extensible controls representing tools may be icons, symbols, text, or other indicia included in a UI. The tool selection element (e.g., toolbar) thus includes an external application tool (e.g., polling tool) and one or both of a canvas tool (e.g., the Sticky Note tool) and a contextual tool (e.g., the Measure tool or the Map Pin tool).

Addition of the extensible control representing the contextual tool to the tool selection element may be done in response to opening the canvas application in the canvas. Thus, opening a canvas application may result in the collaboration application updating the selection of tools without further specific user input (e.g., automatically adding the contextual tool to the toolbar). The contextual tool is a tool that provides functionality specific to the canvas application. In one example, the collaboration application references a manifest associated with the canvas application. If the manifest specifies inclusion of the contextual tool on the tool selection element, then the collaboration application adds the extensible control representing the contextual tool to the tool selection element and makes the corresponding tool functionality available.

At operation 908, a selection of the tool of the external application is received through an interaction with the tool selection element. Any user interacting with this canvas through the application may select the external application tool through conventional techniques for selecting a tool from a menu, toolbar, etc.

At operation 910, an indication of a location within a display of content of the file opened in the canvas is received from user input. The location may be indicated by a user selecting a point on the canvas or an object within the file. In one example, the location comprises a set of coordinates representing a position on the file relative to a coordinate system such as a set of x-, y-coordinates that represents an offset from a reference position. In one example, the location comprises an identifier of an object in the file such as a name of the object, an object ID, etc. The type of object is based on the canvas application. For example, a word processing application may use page and line numbers to represent objects while a mapping application may use street addresses.

At operation 912, an anchor representing the tool from the external application is placed at the location. The collaboration application may indicate use of the external application tool by showing a "pin" or other UI designation of the location. The anchor is generally small and visually unobtrusive so that the content of the file may be readily viewed without being cover or obscured by the anchor.

At operation 914, a smart hook comprising an identifier of the file, an identifier of the tool of the external application, and an identifier of the location is stored. The smart hook contains the information which makes it possible for the anchor representing the tool of the external application to be placed at the location on the file when the file is re-opened in the canvas. The anchor may be placed at the same location regardless of which user or computing device opens the file. In an example, the smart hook further comprises an identifier of a user associated with the selection of the tool. This allows the specific instance of use of the external application tool to be associated with a user.

At operation 916, data is received through a dedicated region of the UI of the application (e.g., a container). The data defines a configuration of the external application and is passed from the collaboration application to the external application. Thus, anything entered in the container that holds the instance of the external application is sent to the external application for processing by the external application. Data generated in response by the external application may be shown in the container.

FIG. 10 shows a routine 1000 for using a smart hook to place an anchor representing the tool at a previously specified location in a display of content opened in a canvas. Thus, routine 1000 shows operations for "rehydrating" an anchor. As used herein, rehydrate refers to loading the applications, files, and data indicated by a smart hook into a collaboration application. This is the opposite of dehydrating. Rehydration uses the pointers provided by the smart hook to locate the appropriate applications and data to generate a UI element that is shown in the canvas region of a collaboration application at the previously specified location.

At operation 1002, an indication of a file to open in a canvas of a collaboration application is received from a user. This indication may be received from interaction of the user with a canvas application that is opened inside of a collaboration application. For example, the user may select an open-file command from a menu presented by the canvas application.

At operation 1004, an identifier of a tool from an external application and an identifier of a location within a display of content of the file to place an anchor representing the tool of the external application are obtained from a smart hook associated with the file. The smart hook comprises a data structure created by the collaboration application. The association between the file and the smart hook may be maintained by the file so that when the file is opened it provides an indication of which smart hook(s) to access. Alternatively or additionally, the association between the file and the smart hook may be maintained by the collaboration application so that when the file is opened the collaboration searches for any smart hook(s) that reference the file.

As described above, the location in the smart hook may comprise a set of coordinates representing a position on the file relative to a coordinate system, the location may comprises an identifier of an object in the file and a type of the object is based on the canvas application, or the location may be represented in another manner that is mutually understood by the canvas application and the collaboration application.

At operation 1006, the canvas application configured to render the file in the canvas is opened. This may be re-opening of a canvas application that as previously opened in this or another canvas. Opening the canvas application may cause the canvas application to occupy all or substantially of the canvas region of a UI generated by the collaboration application.

At operation 1008, the file is opened in the canvas application.

At operation 1010, the anchor representing the tool of the external application is placed at the location within the display of content of the file. This is "rehydrating" the anchor according to the relationship stored in the smart hook.

At operation 1012, interaction with the tool marked is detected. The detection may be done by any of the collaboration application, the canvas application, or the external application. The interaction may be any type of conventional interaction with a UI element such as a mouse click, a mouseover, selection by touch on a touch screen, selection with keyboard commands, selection by voice commands, selection by gestures, etc.

At operation 1014, a dedicated region on the canvas associated with the tool of the external application that enables data entered in the dedicated region to pass to the external application is created. This is creation, or display, of a container that holds the external application. Creation of the dedicated region on the canvas associated with the tool of the external application in response to detection of the interaction at operation 1012.

It should be appreciated that the above-described subject matter may be implemented as a computer-controlled apparatus, a computer process, a computing system, or as an article of manufacture such as a computer-readable storage medium. The operations of the example methods are illustrated in individual blocks and summarized with reference to those blocks. The methods are illustrated as logical flows of blocks, each block of which can represent one or more operations that can be implemented in hardware, software, or a combination thereof. In the context of software, the operations represent computer-executable instructions stored on one or more computer-readable media that, when executed by one or more processors, enable the one or more processors to perform the recited operations.

Generally, computer-executable instructions include routines, programs, objects, modules, components, data structures, and the like that perform particular functions or implement particular abstract data types. The order in which the operations are described is not intended to be construed as a limitation, and any number of the described operations can be executed in any order, combined in any order, subdivided into multiple sub-operations, and/or executed in parallel to implement the described processes. The described processes can be performed by resources associated with one or more device(s) such as one or more internal or external central processing units (CPUs) or graphics processing units (GPUs), and/or one or more pieces of hardware logic such as field-programmable gate arrays ("FPGAs"), digital signal processors ("DSPs"), or other types of accelerators.

All of the methods and processes described above may be embodied in, and fully automated via, software code modules executed by one or more general purpose computers or processors. The code modules may be stored in any type of computer-readable storage medium or other computer storage device, such as those described below. Some or all of the methods may alternatively be embodied in specialized computer hardware, such as that described below.

Any routine descriptions, elements or blocks in the flow diagrams described herein and/or depicted in the attached FIGs. should be understood as potentially representing modules, segments, or portions of code that include one or more executable instructions for implementing specific logical functions or elements in the routine. Alternate implementations are included within the scope of the examples described herein in which elements or functions may be deleted, or executed out of order from that shown or discussed, including substantially synchronously or in reverse order, depending on the functionality involved as would be understood by those skilled in the art.

Figure 11:
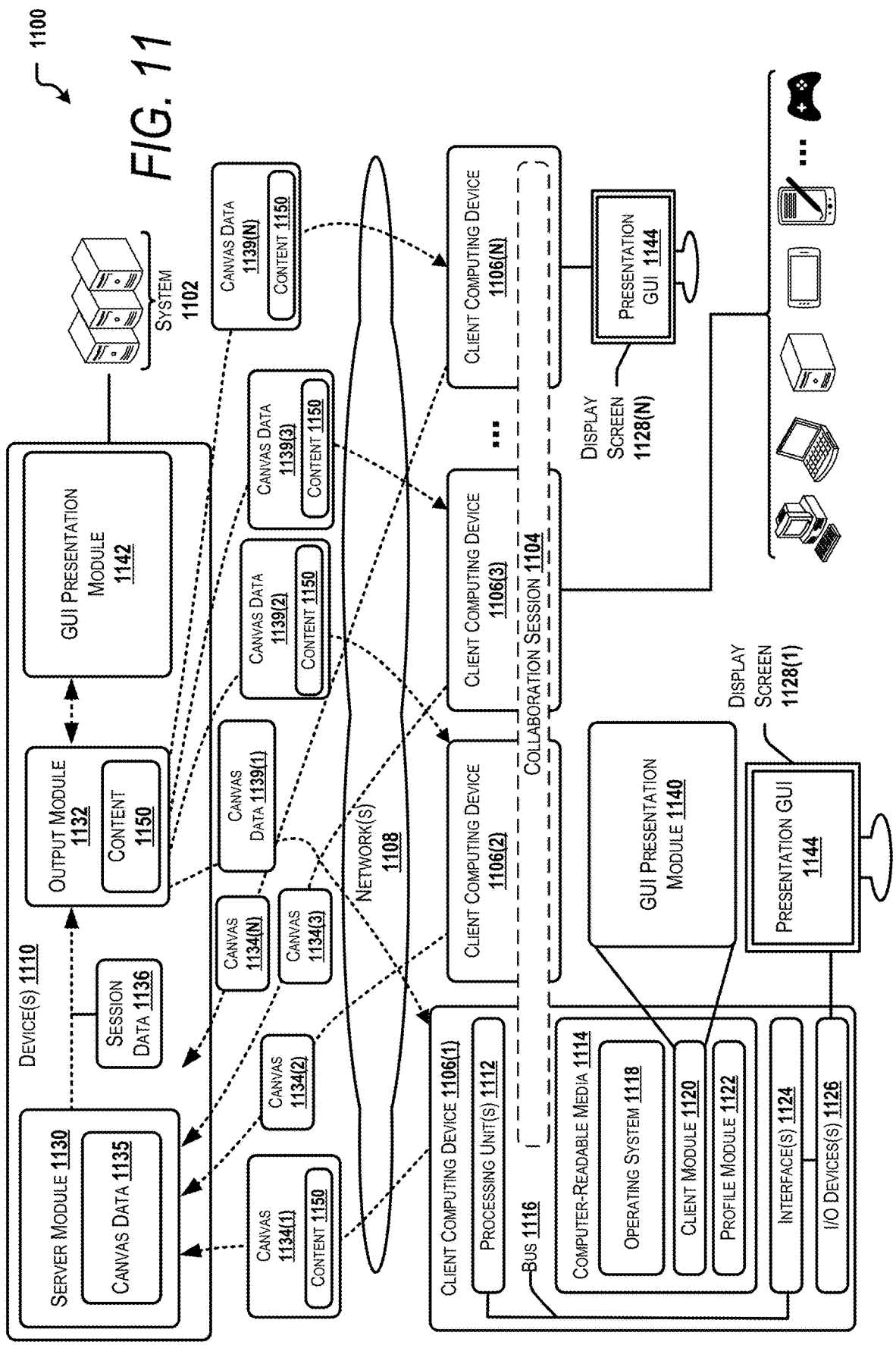
FIG. 11 is a computing system diagram showing aspects of an illustrative operating environment for the technologies disclosed herein.

FIG. 11 is a diagram illustrating an example environment 1100 in which a system 1102 can implement the techniques disclosed herein. In some implementations, a system 1102 (also referred to as a data processing system) may function to collect, analyze, and share data or characteristics regarding one or more canvases that are created in collaboration applications.

As illustrated, a collaboration session 1104 (also referred to as a "communication session 1104") may be implemented between a number of client computing devices 1106(1) through 1106(N) (where N is a number having a value of two or greater) that are associated with or are part of the system 1102. The client computing devices 1106(1) through 1106(N) enable users, also referred to as individuals, to participate in the collaboration session 1104.

In this example, the collaboration session 1104 is hosted, over one or more network(s) 1108, by the system 1102. That is, the system 1102 can provide a service that enables users of the client computing devices 1106(1) through 1106(N) to participate in the collaboration session 1104 (e.g., by exchanging email messages and/or participating in a shared collaboration channel). Consequently, a "participant" to the collaboration session 1104 can comprise a user and/or a client computing device (e.g., multiple users may be in a room participating in a collaboration session via the use of a single client computing device), each of which can communicate with other participants. As an alternative, the collaboration session 1104 can be hosted by one of the client computing devices 1106(1) through 1106(N) utilizing peer-to-peer technologies. The system 1102 can also host video conferencing, chat conversations, and other team collaboration functionality (e.g., as part of an application suite).

In examples described herein, client computing devices 1106(1) through 1106(N) participating in the collaboration session 1104 are configured to receive and render for display, on a user interface of a display screen, canvas data. The canvas data can comprise a collection of tools, applications opened in the canvas, smart hooks, external application data, or other types of canvas content. The collection of various instances of canvas data related to the content contained in a canvas of a collaboration application may be simply be referred to as a canvas.

A user can view the content of the collaboration session 1104 using a computing device. In examples described herein, the client computing devices 1106(1) through 1106(N) participating in the collaboration session 1104 are configured to receive and render for display, on a user interface of a display screen, canvas data.

The system 1102 of FIG. 11 includes device(s) 1110. The device(s) 1110 and/or other components of the system 1102 can include distributed computing resources that communicate with one another and/or with the client computing devices 1106(1) through 1106(N) via the one or more network(s) 1108. In some examples, the system 1102 may be an independent system that is tasked with managing aspects of one or more collaborative working environments such as collaboration session 1104. As an example, the system 1102 may be managed by entities such as SLACK, WEBEX, GOTOMEETING, GOOGLE HANGOUTS, etc.

Network(s) 1108 may include, for example, public networks such as the Internet, private networks such as an institutional and/or personal intranet, or some combination of private and public networks. Network(s) 1108 may also include any type of wired and/or wireless network, including but not limited to local area networks ("LANs"), wide area networks ("WANs"), satellite networks, cable networks, Wi-Fi networks, WiMax networks, mobile communications networks (e.g., 3G, 4G, 5G, and so forth) or any combination thereof. Network(s) 1108 may utilize communications protocols, including packet-based and/or datagram-based protocols such as Internet protocol ("IP"), transmission control protocol ("TCP"), user datagram protocol ("UDP"), or other types of protocols. Moreover, network(s) 1108 may also include a number of devices that facilitate network communications and/or form a hardware basis for the networks, such as switches, routers, gateways, access points, firewalls, base stations, repeaters, backbone devices, and the like.

In some examples, network(s) 1108 may further include devices that enable connection to a wireless network, such as a wireless access point ("WAP"). Examples support connectivity through WAPs that send and receive data over various electromagnetic frequencies (e.g., radio frequencies), including WAPs that support Institute of Electrical and Electronics Engineers ("IEEE") 802.12 standards (e.g., 802.12g, 802.12n, 802.12ac and so forth), and other standards.

In various examples, device(s) 1110 may include one or more computing devices that operate in a cluster or other grouped configuration to share resources, balance load, increase performance, provide fail-over support or redundancy, or for other purposes. For instance, device(s) 1110 may belong to a variety of classes of devices such as traditional server-type devices, desktop computer-type devices, and/or mobile-type devices. Thus, although illustrated as a single type of device or a server-type device, device(s) 1110 may include a diverse variety of device types and are not limited to a particular type of device. Device(s) 1110 may represent, but are not limited to, server computers, desktop computers, web-server computers, personal computers, mobile computers, laptop computers, tablet computers, or any other sort of computing device.

A client computing device (e.g., one of client computing device(s) 1106(1) through 1106(N)) may belong to a variety of classes of devices, which may be the same as, or different from, device(s) 1110, such as traditional client-type devices, desktop computer-type devices, mobile-type devices, special purpose-type devices, embedded-type devices, and/or wearable-type devices. Thus, a client computing device can include, but is not limited to, a desktop computer, a game console and/or a gaming device, a tablet computer, a personal data assistant ("PDA"), a mobile phone/tablet hybrid, a laptop computer, a telecommunication device, a computer navigation type client computing device such as a satellite-based navigation system including a global positioning system ("GPS") device, a wearable device, a virtual reality ("VR") device, an augmented reality ("AR") device, an implanted computing device, an automotive computer, a network-enabled television, a thin client, a terminal, an Internet of Things ("IoT") device, a work station, a media player, a personal video recorder ("PVR"), a set-top box, a camera, an integrated component (e.g., a peripheral device) for inclusion in a computing device, an appliance, or any other sort of computing device. Moreover, the client computing device may include a combination of the earlier listed examples of the client computing device such as, for example, desktop computer-type devices or a mobile-type device in combination with a wearable device, etc.

Client computing device(s) 1106(1) through 1106(N) of the various classes and device types can represent any type of computing device having one or more data processing unit(s) 1112 operably connected to computer-readable media 1114 such as via a bus 1116, which in some instances can include one or more of a system bus, a data bus, an address bus, a PCI bus, a Mini-PCI bus, and any variety of local, peripheral, and/or independent buses.

Executable instructions stored on computer-readable media 1114 may include, for example, an operating system 1118, a client module 1120, a profile module 1122, and other modules, programs, or applications that are loadable and executable by data processing units(s) 1112.

Client computing device(s) 1106(1) through 1106(N) may also include one or more interface(s) 1124 to enable communications between client computing device(s) 1106(1) through 1106(N) and other networked devices, such as device(s) 1110, over network(s) 1108. Such network interface(s) 1124 may include one or more network interface controllers (NICs) or other types of transceiver devices to send and receive communications and/or data over a network. Moreover, client computing device(s) 1106(1) through 1106(N) can include input/output ("I/O") interfaces (devices) 1126 that enable communications with input/output devices such as user input devices including peripheral input devices (e.g., a game controller, a keyboard, a mouse, a pen, a voice input device such as a microphone, a video camera for obtaining and providing video feeds and/or still images, a touch input device, a gestural input device, and the like) and/or output devices including peripheral output devices (e.g., a display, a printer, audio speakers, a haptic output device, and the like). FIG. 11 illustrates that client computing device 1106(1) is in some way connected to a display device (e.g., a display screen 1128(N)), which can display a UI according to the techniques described herein.

In the example environment 1100 of FIG. 11, client computing devices 1106(1) through 1106(N) may use their respective client modules 1120 to connect with one another and/or other external device(s) in order to participate in the collaboration session 1104, or in order to contribute actively to a canvas or collaboration environment. For instance, a first user may utilize a client computing device 1106(1) to communicate with a second user of another client computing device 1106(2). When executing client modules 1120, the users may share data, which may cause the client computing device 1106(1) to connect to the system 1102 and/or the other client computing devices 1106(2) through 1106(N) over the network(s) 1108.

The client computing device(s) 1106(1) through 1106(N) may use their respective profile modules 1122 to generate participant profiles (not shown in FIG. 11) and provide the participant profiles to other client computing devices and/or to the device(s) 1110 of the system 1102. A participant profile may include one or more of an identity of a user or a group of users (e.g., a user name, an email address, a unique identifier ("ID"), a recipient ID, etc.), user data such as personal data, machine data such as location (e.g., an IP address, a room in a building, etc.) and technical capabilities, etc. Participant profiles may be utilized to register participants for collaboration sessions.

As shown in FIG. 11, the device(s) 1110 of the system 1102 include a server module 1130 and an output module 1132. In this example, the server module 1130 is configured to receive, from individual client computing devices such as client computing devices 1106(1) through 1106(N), canvases 1134(1) through 1134(N). As described above, canvases can comprise an application opened in the canvas, one or more tools, data from an external application, and so forth. Thus, the server module 1130 is configured to receive a collection of various canvases 1134(1) through 1134(N) during the collaboration session 1104 (the collection is referred to herein as "canvas data" 1135). In some scenarios, not all of the client computing devices that participate in the collaboration session 1104 provide canvas data. For example, a client computing device may only be a consuming, or a "receiving," device such that it only receives content associated with the collaboration session 1104 but does not provide any content to the collaboration session 1104.

In various examples, the server module 1130 can select aspects of the canvases 1134 that are to be shared with individual ones of the participating client computing devices 1106(1) through 1106(N). Consequently, the server module 1130 may be configured to generate session data 1136 based on the canvases 1134 and/or past session data 1136 to the output module 1132. Then, the output module 1132 may communicate canvas data 1139 to the client computing devices (e.g., client computing devices 1106(1) through 1106(3) participating in the collaboration session). The canvas data 1139 may include text, images, video, audio, smart hooks, and/or other content data, provided by the output module 1132 based on content 1150 associated with the output module 1132 and based on received session data 1136.

As shown, the output module 1132 transmits canvas data 1139(1) to client computing device 1106(1), and transmits canvas data 1139(2) with content 1150 to client computing device 1106(2), and transmits canvas data 1139(3) with content 1150 to client computing device 1106(3), etc. The canvas data 1139 transmitted to the client computing devices can be the same or can be different (e.g., the same chat message sent to multiple participants or each participant receiving a different email message).

In various implementations, the device(s) 1110 and/or the client module 1120 can include a graphical user interface (GUI) presentation module 1240. The GUI presentation module 1140 may be configured to analyze canvas data 1139 that is for delivery to one or more of the client computing devices 1106. Specifically, the GUI presentation module 1140, at the device(s) 1110 and/or the client computing device 1106, may analyze canvas data 1139 to determine an appropriate manner for displaying the collaboration application, a canvas application opened in the collaboration application, anchors representing one or more tools pinned to the canvas application, and/or content from external application presented within the canvas on the display screen 1128 of an associated client computing device 1106. In some implementations, the GUI presentation module 1140 may provide communication content to a presentation GUI 1144 rendered on the display screen 1128 of the associated client computing device 1106. The presentation GUI 1144 may be caused to be rendered on the display screen 1128 by the GUI presentation module 1140. The presentation GUI 1144 may include the user interface of the collaboration application, a canvas, one or more applications opened in the canvas, visual elements representing tools such as anchors, toolbars, tool menus, containers holding content from external applications, etc.

In some implementations, the presentation GUI 1144 may include a plurality of sections or grids that may render or comprise text, video, image, and/or content for display on the display screen 1128. For example, a first section of the presentation GUI 1144 may include a menu or selection of tools for a collaboration application, a second section of the presentation GUI 1144 may include a canvas for interacting with a function provided by the collaboration application. The GUI presentation module 1140 may populate the second section of the presentation GUI 1144 in a manner that displays a single application or multiple applications within the canvas.

Figure 12:
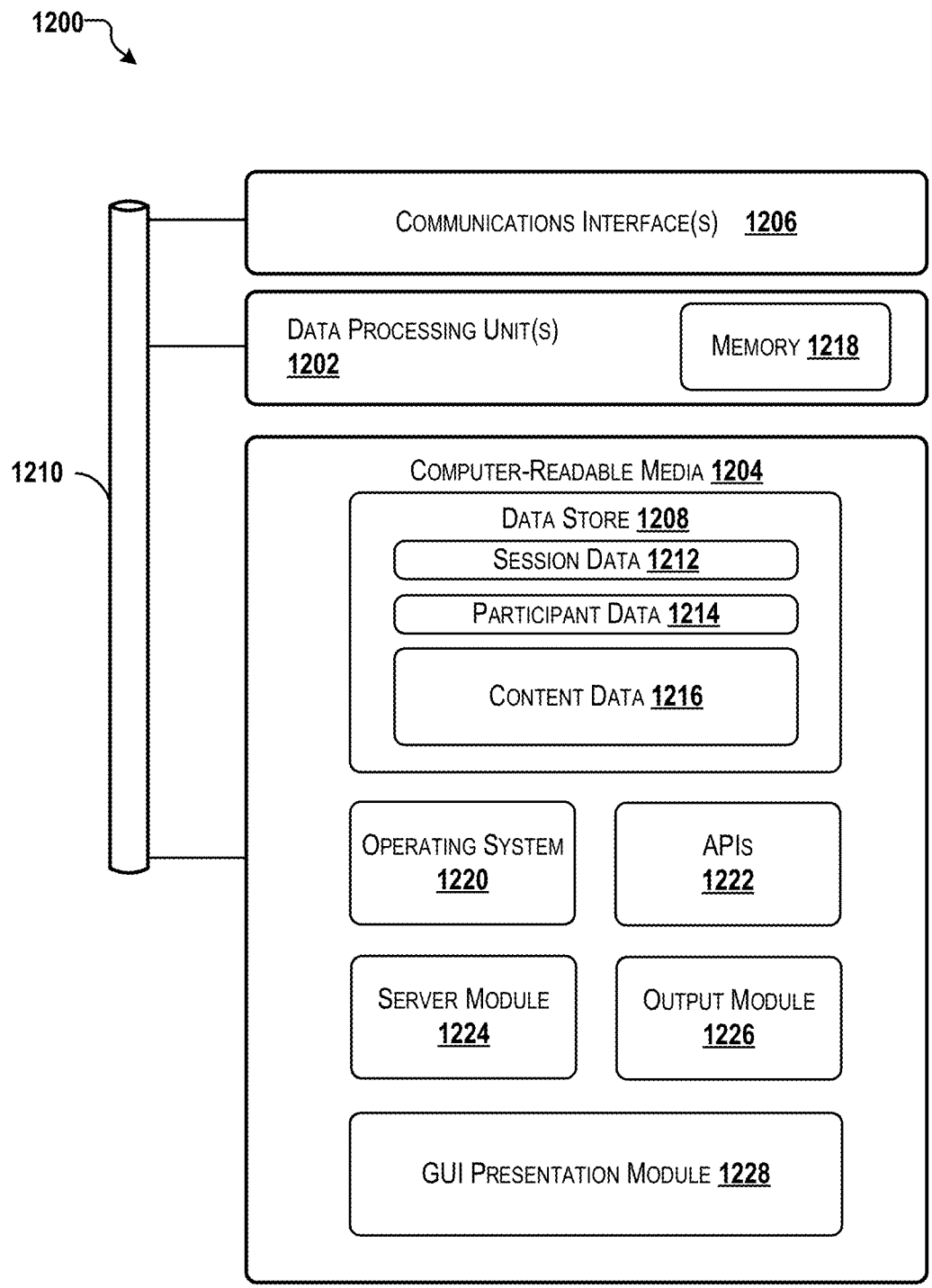
FIG. 12 is a computing architecture diagram showing aspects of the configuration and operation of a computing device that can implement aspects of the technologies disclosed herein.

FIG. 12 illustrates a diagram that shows example components of an example device 1200 (also referred to herein as a "computing device" or a "data processing system") configured to generate data for one or more of the implementations disclosed herein. The device 1200 may generate data that includes one or more canvases for display on the display screen 1128 shown in FIG. 11. The device 1200 may represent any of the device(s) described herein. For example, the device 1200 may represent the computing device 302, the client computing devices 1106, or the device(s) 1110.

As illustrated, the device 1200 includes one or more data processing unit(s) 1202, computer-readable media 1204, and communication interface(s) 1206. The components of the device 1200 are operatively connected, for example, via a bus 1209, which may include one or more of a system bus, a data bus, an address bus, a PCI bus, a Mini-PCI bus, and any variety of local, peripheral, and/or independent buses.

As utilized herein, data processing unit(s), such as the data processing unit(s) 1202 and/or data processing unit(s) 1112, may represent, for example, a CPU-type data processing unit, a GPU-type data processing unit, a field-programmable gate array ("FPGA"), another class of DSP, or other hardware logic components that may, in some instances, be driven by a CPU. For example, and without limitation, illustrative types of hardware logic components that may be utilized include Application-Specific Integrated Circuits ("ASICs"), Application-Specific Standard Products ("ASSPs"), System-on-a-Chip Systems ("SOCs"), Complex Programmable Logic Devices ("CPLDs"), etc.

As utilized herein, computer-readable media, such as computer-readable media 1204 and computer-readable media 1214, may store instructions executable by the data processing unit(s). The computer-readable media may also store instructions executable by external data processing units such as by an external CPU, an external GPU, and/or executable by an external accelerator, such as an FPGA type accelerator, a DSP type accelerator, or any other internal or external accelerator. In various examples, at least one CPU, GPU, and/or accelerator is incorporated in a computing device, while in some examples one or more of a CPU, GPU, and/or accelerator is external to a computing device.

Computer-readable media, which might also be referred to herein as a computer-readable medium, includes computer-readable storage media and/or communication media. Computer-readable storage media may include one or more of volatile memory, nonvolatile memory, and/or other persistent and/or auxiliary computer-readable storage media, removable and non-removable computer-readable storage media implemented in any method or technology for storage of information such as computer-readable instructions, data structures, program modules, or other data. Thus, computer-readable storage media includes tangible and/or physical forms of media included in a device and/or hardware component that is part of a device or external to a device, including but not limited to random access memory ("RAM"), static random-access memory ("SRAM"), dynamic random-access memory ("DRAM"), phase change memory ("PCM"), read-only memory ("ROM"), erasable programmable read-only memory ("EPROM"), electrically erasable programmable read-only memory ("EEPROM"), flash memory, compact disc read-only memory ("CD-ROM"), digital versatile disks ("DVDs"), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media may embody computer-readable instructions, data structures, program modules, or other data in a modulated data signal, such as a carrier wave, or other transmission mechanism. As defined herein, computer-readable storage media does not include communication media. That is, computer-readable storage media does not include communications media consisting solely of a modulated data signal, a carrier wave, or a propagated signal, per se.

Communication interface(s) 1206 may represent, for example, network interface controllers ("NICs") or other types of transceiver devices to send and receive communications over a network.

In the illustrated example, computer-readable media 1204 includes a data store 1208. In some examples, the data store 1208 includes data storage such as a database, data warehouse, or other type of structured or unstructured data storage. In some examples, the data store 1208 includes a corpus and/or a relational database with one or more tables, indices, stored procedures, and so forth to enable data access including one or more of hypertext markup language ("HTML") tables, resource description framework ("RDF") tables, web ontology language ("OWL") tables, and/or extensible markup language ("XML") tables, for example.

The data store 1208 may store data for the operations of processes, applications, components, and/or modules stored in computer-readable media 1204 and/or executed by data processing unit(s) 1202 and/or accelerator(s). For instance, in some examples, the data store 1208 may store session data 1212 (e.g., session data 1136 as shown in FIG. 11), participant data 1214 (e.g., associated with a user profile), and/or other data. The session data 1212 can include a total number of participants (e.g., users and/or client computing devices) in a collaboration session, activity that occurs in the collaboration session, a list of applications and/or tools available to the collaboration session, smart hooks used on one or more applications in the collaboration session, and/or other data related to how the collaboration session is conducted. The data store 1208 may also include content data 1216, such as the content of communications within the collaboration session.

Alternately, some or all of the above-referenced data can be stored on separate memory 1218 on board one or more data processing unit(s) 1202 such as a memory on board a CPU-type processor, a GPU-type processor, an FPGA-type accelerator, a DSP-type accelerator, and/or another accelerator. In this example, the computer-readable media 1204 also includes an operating system 1220 and application programming interface(s) 1222 (APIs) configured to expose the functionality and the data of the device 1200 to other devices. Additionally, the computer-readable media 1204 includes one or more modules such as a server module 1224 (e.g., the server module 1130 as shown in FIG. 11), an output module 1226 (e.g., output module 1132 as shown in FIG. 11), and a GUI presentation module 1228 (e.g., GUI presentation module 1140 as shown in FIG. 11), although the number of illustrated modules is just an example, and the number may vary higher or lower. That is, the functionality described herein in association with the illustrated modules may be performed by a fewer number of modules or a larger number of modules on one device or spread across multiple devices.

Illustrative Embodiments

The following clauses described multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. A method for pinning an anchor representing content generated by an external application, the method to be performed by a data processing system, the method comprising: rendering an extensible control representing the external application tool in a tool selection element of the canvas, wherein the extensible control is selected based on a data type of content in the canvas; receiving a selection of the external application tool through an interaction with the tool selection element; receiving a user input defining a location within a display of the content in the canvas; placing the anchor representing the external application tool at the location; and storing a hook comprising an identifier of the content, an identifier of the external application tool, and an identifier of the location such that the anchor representing the external application tool is able to be placed at the location within the display of the content in the canvas when the content is later opened in the canvas.

Clause 2. The method of clause 1, wherein the hook further comprises an identifier of a user associated with the selection of the tool.

Clause 3. The method of any of clauses 1-2, wherein the location comprises a set of coordinates representing a position on the content in the canvas relative to a coordinate system.

Clause 4. The method of any of clauses 1-3, wherein the location comprises an identifier of an object in the content in the canvas and a type of the object is based on the canvas application.

Clause 5. The method of any of clauses 1-4, further comprising receiving data through a dedicated region of a user interface (UI) of the application, the data defining a configuration of the external application, wherein the data is passed from the application to the external application.

Clause 6. The method of any of clauses 1-5, wherein the tool selection element also includes at least one of an extensible control representing a canvas tool or an extensible control representing a contextual tool.

Clause 7. The method of clause 6, further comprising adding the extensible control representing the contextual tool to the tool selection element in response to opening a type of a canvas application, wherein the contextual tool provides functionality specific to the type of canvas application.

Clause 8. The method of clause 7, wherein the adding the extensible control representing the contextual tool comprises referencing a manifest associated with the canvas application, the manifest specifying inclusion of the contextual tool on the tool selection element.

Clause 9. A system comprising: one or more data processing units; and a computer-readable medium having encoded thereon computer-executable instructions to cause the one or more data processing units to: receive an indication from a user of content to open in a canvas of an application; obtain, from a hook associated with the content, an identifier of an external application tool from an external application and an identifier of a location within a display of the content in the canvas to place an anchor representing the external application tool that provides functionality of the external application; open a canvas application configured to render the content in the canvas; open the content in the canvas application; and place the anchor representing the external application tool at the location within the display of content in the canvas.

Clause 10. The system of clause 9, wherein the hook comprises a data structure created by the application.

Clause 11. The system of any of clauses 9-10, wherein the location comprises a set of coordinates representing a position on the content in the canvas relative to a coordinate system.

Clause 12. The system of any of clauses 9-11, wherein the location comprises an identifier of an object in the content in the canvas and a type of the object is based on the canvas application.

Clause 13. The system of any of clause 9-12, wherein the instructions further cause the one or more data processing units to create a dedicated region on the canvas associated with the external application tool of the that enables data entered in the dedicated region on the canvas to pass to the external application.

Clause 14. The system of clause 13, wherein the instructions further cause the one or more data processing units to create the dedicated region on the canvas in response to detection of an interaction with the anchor representing the external application tool.

Clause 15. The system of any of clauses 9-14, wherein the instructions further cause the one or more data processing units to display a tool selection element within the canvas, the tool selection element comprising an extensible control representing a canvas tool, an extensible control representing a contextual tool, and an extensible control representing the external application tool.

Clause 16. The system of any of clause 9-15, wherein the instructions further cause the one or more data processing units to: determine a class of application, the class of application based on the canvas application currently opened in the canvas; and display a tool selection element on the canvas, the tool selection element including at least one contextual tool that is associated with the class of applications.

Clause 17. A system comprising: means for rendering an extensible control representing an external application tool of an external application in a tool selection element displayed in a canvas of an application; means for receiving a selection of the external application tool from a user through an interaction with the tool selection element; means for receiving an indication through a user interface of the application of a location within a display of content in the canvas; means for placing an anchor representing the external application tool at the location; and means for storing a hook comprising an identifier of the content, an identifier of the external application tool, and an identifier of the location such that the anchor representing the external application tool is able to be placed at the location on the canvas application when the content is re-opened in the canvas.

Clause 18. The system of clause 17, wherein the location comprises one of: a set of coordinates representing a position on the content in the canvas relative to a coordinate system; or an identifier of an object in the file, a type of the object is based on the canvas application.

Clause 19. The system of any of clauses 17-18, further comprising means for receiving data through the UI of the application defining a configuration of the external application.

Clause 20. The system of any of clauses 17-19 save the file, wherein the tool selection element also includes an extensible control representing a canvas tool and an extensible control representing a contextual tool and further comprising: means for receiving the contextual tool based on the canvas application opened in the canvas, wherein the contextual tool provides functionality specific to the canvas application; and means for adding the contextual tool to the tool selection element.

CONCLUSION

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention (especially in the context of the following claims) are to be construed to cover both the singular and the plural unless otherwise indicated herein or clearly contradicted by context. The terms "based on," "based upon," and similar referents are to be construed as meaning "based at least in part" which includes being "based in part" and "based in whole," unless otherwise indicated or clearly contradicted by context.

It should be appreciated that any reference to "first," "second," etc. users or other elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element (e.g., two different users, two different virtual machines, etc.).

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

The invention claimed is:

1. A method for pinning an anchor representing content generated by an external application, the method to be performed by a data processing system, the method comprising:
   in a canvas that is a shared content editing workspace in which a canvas application is open, wherein the canvas application is an application that is accessed in the shared content editing workspace:
   rendering an extensible control representing an external application tool in a tool selection element of the canvas, wherein the extensible control is selected based on a data type of content in the canvas application, and wherein the tool selection element also includes an extensible control representing a canvas tool that is a standard tool available to any canvas application and an extensible control representing a contextual tool that provides functionality specific to the canvas application and is provided by the canvas application;
   receiving a selection of the external application tool through an interaction with the tool selection element;
   receiving a user input defining a location within a display of the content in the canvas;
   placing the anchor representing the external application tool at the location; and
   storing a hook comprising an identifier of the content, an identifier of the external application tool, and an identifier of the location such that the anchor representing the external application tool is able to be placed at the location within the display of the content in the canvas when the content is later opened in the canvas.

2. The method of claim 1, wherein the hook further comprises an identifier of a user associated with the selection of the tool.

3. The method of claim 1, wherein the location comprises a set of coordinates representing a position on the content in the canvas relative to a coordinate system.

4. The method of claim 1, wherein the location comprises an identifier of an object in the content in the canvas and a type of the object is based on the canvas application.

5. The method of claim 1, further comprising receiving data through a dedicated region of a user interface (UI) of the canvas application, the data defining a configuration of the external application, wherein the data is passed from the application to the external application.

6. The method of claim 1, further comprising adding the extensible control representing the contextual tool to the tool selection element in response to opening a type of canvas application, wherein the contextual tool provides functionality specific to the type of canvas application.

7. The method of claim 6, wherein the adding the extensible control representing the contextual tool comprises referencing a manifest associated with the canvas application, the manifest specifying inclusion of the contextual tool on the tool selection element.

8. A system comprising:
one or more data processing units; and
a computer-readable medium having encoded thereon computer-executable instructions to cause the one or more data processing units to:
receive an indication from a user of content to open a canvas application in a canvas that is a shared content editing workspace, wherein the canvas application is an application that is accessed in the shared content editing workspace;
display a tool selection element within the canvas, the tool selection element comprising an extensible control representing a canvas tool that is a standard tool available to any canvas application, an extensible control representing a contextual tool that provides functionality specific to the canvas application and is provided by the canvas application, and an extensible control representing an external application tool from an external application;
obtain, from a hook associated with the content, an identifier of the external application tool and an identifier of a location within a display of the content in the canvas to place an anchor representing the external application tool that provides functionality of the external application;
open a canvas application configured to render the content in the canvas;
open the content in the canvas application; and
place the anchor representing the external application tool at the location within the display of the content in the canvas.

9. The system of claim 8, wherein the hook comprises a data structure created by the application.

10. The system of claim 8, wherein the location comprises a set of coordinates representing a position on the content in the canvas relative to a coordinate system.

11. The system of claim 8, wherein the location comprises an identifier of an object in the content in the canvas and a type of the object is based on the canvas application.

12. The system of claim 8, wherein the instructions further cause the one or more data processing units to create a dedicated region on the canvas associated with the external application tool that enables data entered in the dedicated region on the canvas to pass to the external application.

13. The system of claim 12, wherein the instructions further cause the one or more data processing units to create the dedicated region on the canvas in response to detection of an interaction with the anchor representing the external application tool.

14. The system of claim 8, wherein the instructions further cause the one or more data processing units to:
determine a class of application, the class of application based on the canvas application currently opened in the canvas; and
display a tool selection element on the canvas, the tool selection element including at least one contextual tool that is associated with the class of applications.

15. The system of claim 8, wherein the instructions further cause the one or more data processing units to reference a manifest associated with the canvas application, the manifest specifying inclusion of the contextual tool on the tool selection element.

16. A system comprising:
means for rendering an extensible control representing an external application tool of an external application in a tool selection element displayed in a canvas that is a shared content editing workspace in which a canvas application is open, wherein the canvas application is an application that is accessed in the shared content editing workspace and the tool selection element also includes an extensible control representing a canvas tool that is a standard tool available to any canvas application and an extensible control representing a contextual tool that provides functionality specific to the canvas application and is provided by the canvas application;
means for receiving a selection of the external application tool from a user through an interaction with the tool selection element;
means for receiving an indication through a user interface (UI) of the application of a location within a display of content in the canvas;
means for placing an anchor representing the external application tool at the location; and
means for storing a hook comprising an identifier of the content, an identifier of the external application tool, and an identifier of the location such that the anchor representing the external application tool is able to be placed at the location on the canvas application when the content is re-opened in the canvas.

17. The system of claim 16, wherein the location comprises one of:
a set of coordinates representing a position on the content in the canvas relative to a coordinate system; or
an identifier of an object in the content, a type of the object is based on the canvas application.

18. The system of claim 16, further comprising means for receiving data through the UI of the application defining a configuration of the external application.

19. The system of claim 16, further comprising:
means for receiving the contextual tool from the canvas application; and
means for adding the contextual tool to the tool selection element.

20. The system of claim 19, wherein the means for adding the contextual tool to the tool selection element references a manifest associated with the canvas application, the manifest specifying inclusion of the contextual tool on the tool selection element.

* * * * *